United States Patent [19]
Hidaka et al.

[11] Patent Number: 5,566,799
[45] Date of Patent: Oct. 22, 1996

[54] LOW AERODYNAMIC NOISE TYPE CURRENT COLLECTION EQUIPMENT

[75] Inventors: Hideto Hidaka, Okayama; Kengo Iwamoyto, Osaka; Yasuhiro Noguchi; Motohiro Miyamura, both of Hyogo; Seiichi Yazima, Osaka; Inao Sakai, Hyogo, all of Japan

[73] Assignee: West Japan Railway Company, Osaka, Japan

[21] Appl. No.: 375,830

[22] Filed: Jan. 20, 1995

[51] Int. Cl.$^6$ .................. B60L 5/08; B60L 5/20
[52] U.S. Cl. ........................... 191/55; 191/59.1
[58] Field of Search .................. 191/45 R, 50, 191/54, 55, 56, 57, 58, 59, 59.1, 60.4, 64, 65, 66

[56] References Cited

U.S. PATENT DOCUMENTS 4,567,335  1/1986  Griffiths .................. 191/59.1

FOREIGN PATENT DOCUMENTS

| | | | |
|---|---|---|---|
| 3536843 | 4/1987 | Germany | 191/58 |
| 4127803 | 4/1992 | Japan | 191/66 |
| 5049103 | 2/1993 | Japan | 191/55 |
| 5068304 | 3/1993 | Japan | 191/55 |
| 5146004 | 6/1993 | Japan | 191/65 |
| 6022404 | 1/1994 | Japan | 191/65 |
| 2271771 | 11/1986 | U.S.S.R. | 191/50 |

*Primary Examiner*—Karen Merritt
*Assistant Examiner*—Scott L. Lowe
*Attorney, Agent, or Firm*—Wenderoth, Lind & Ponack

[57] ABSTRACT

Low aerodynamic noise type current collection equipment is provided for reducing variations in aerodynamic force applied to a current collector during train operation. A central region (2a) of a current collector (1) having a collector head (2) with a top surface in which a contact strip (3) is embedded is rectangular in cross-section, and each side region is shaped convex in cross-section in the front and rear directions, with e.g. an elliptical shape. The rectangular shape has characteristics such that the magnitude of the aerodynamic lift force would be kept substantially constant even if the inclination angle against the aerial flow would be changed. Accordingly, the cross-sectional shape of the central region (2a) of the current collector (1), which is liable to receive the turbulent aerial flow from the support portion (4) in the current collector (1), makes it possible to suppress the variation in aerodynamic lift force generated in the current collector even if the angle of the aerial flow that would collide against the current collector (1) would be unstable. The cross-sectional shape of each side region (2b) being made convex in the front and rear directions reduces the aerodynamic noise.

20 Claims, 20 Drawing Sheets

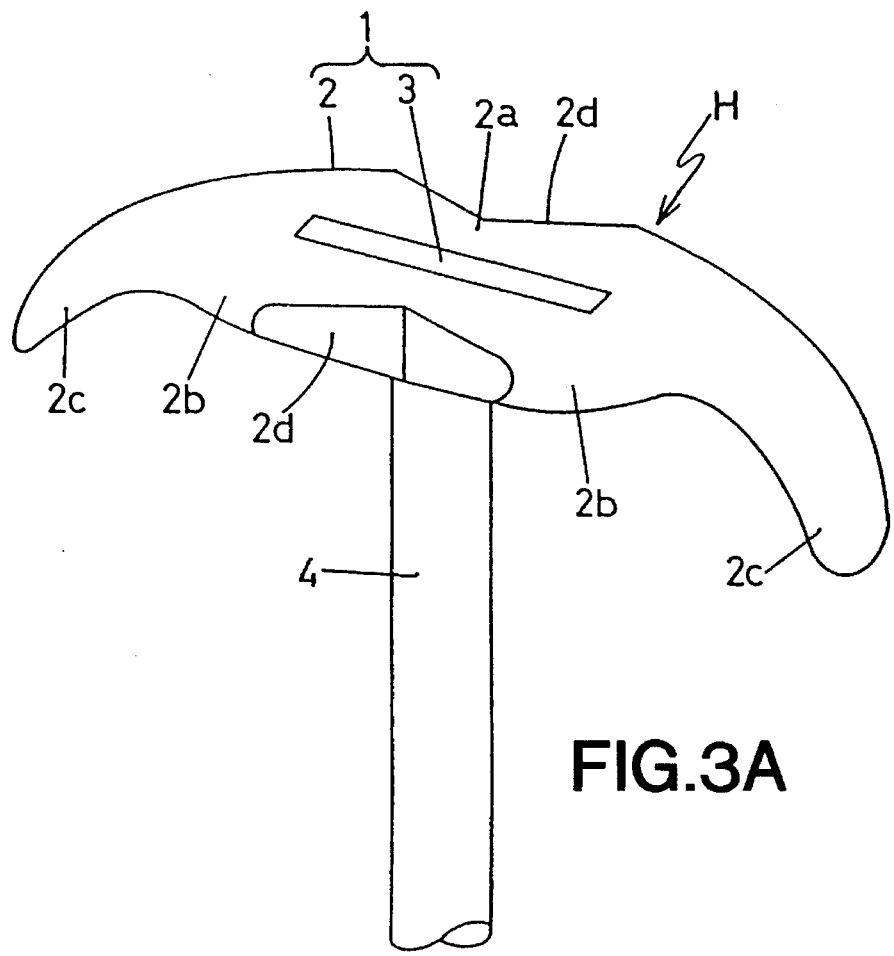
FIG.3A
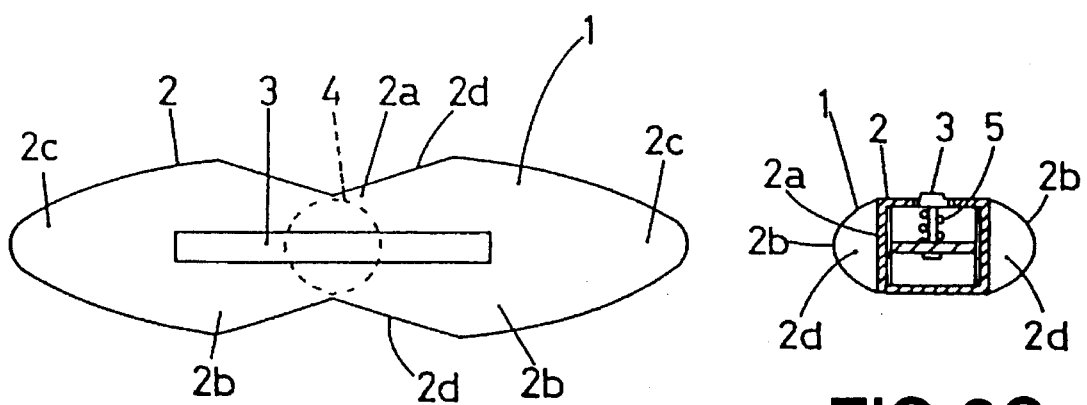
FIG.3B
FIG.3C

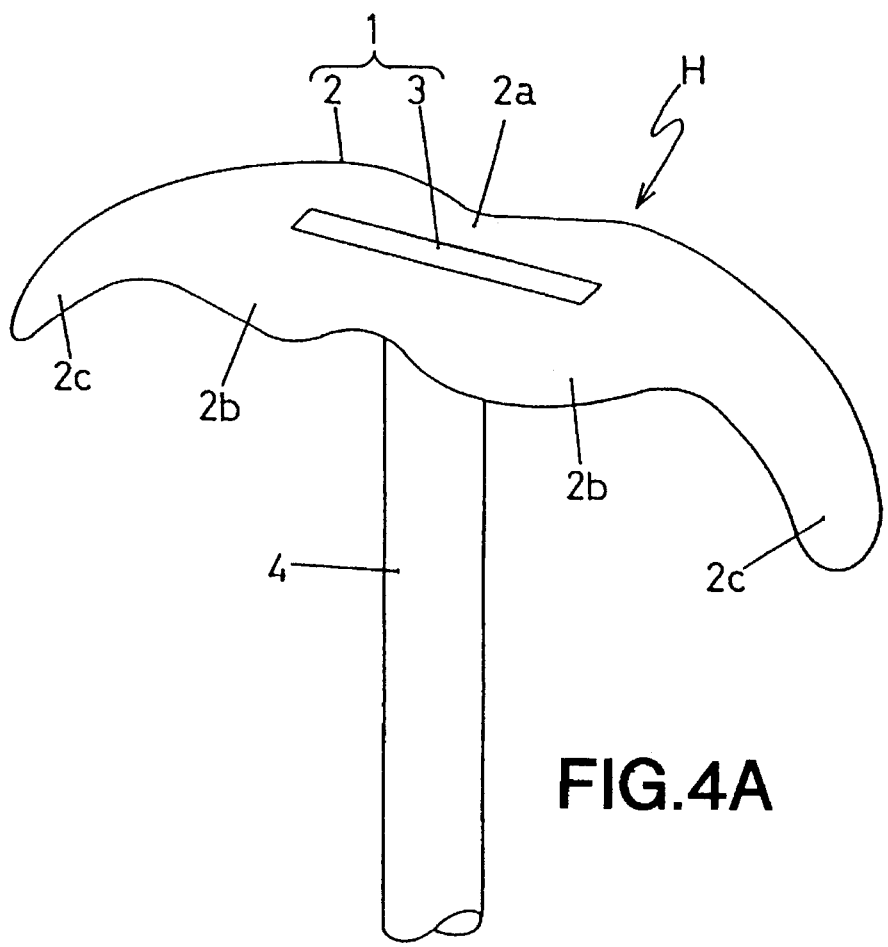
FIG.4A
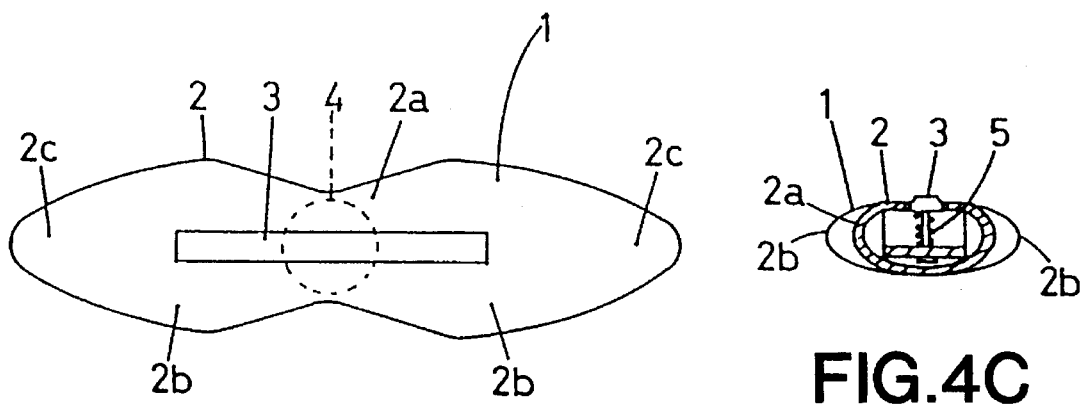
FIG.4B
FIG.4C

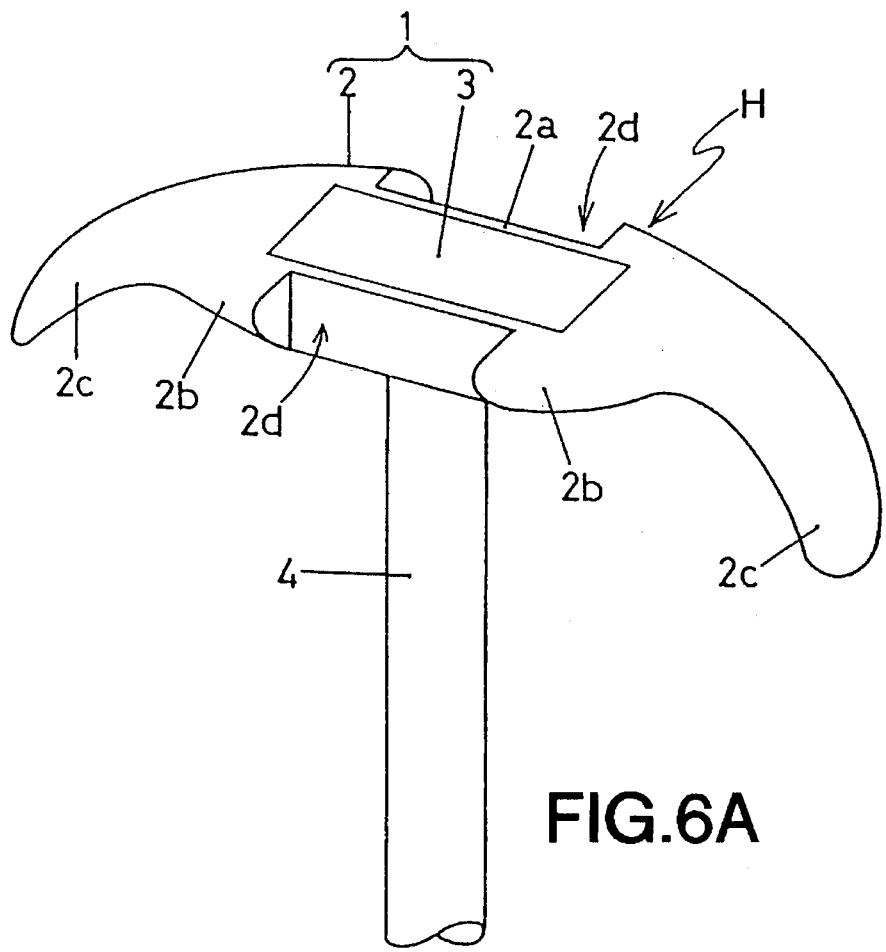
FIG.6A
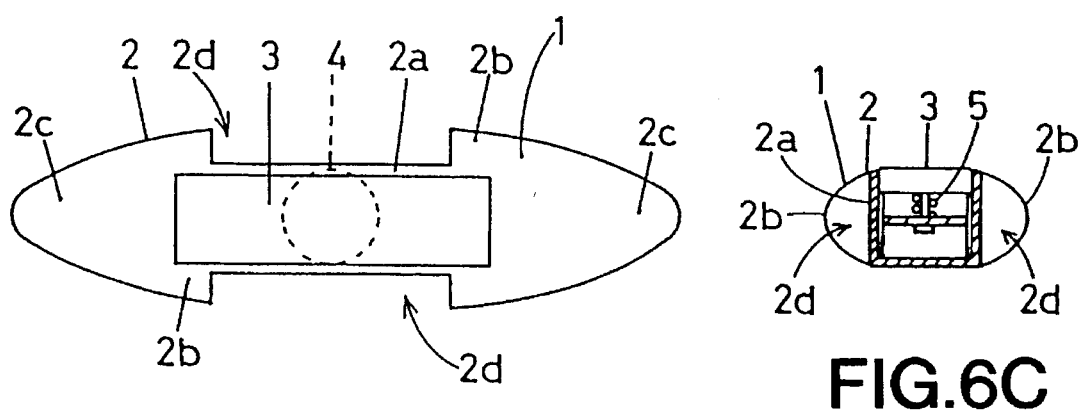
FIG.6B
FIG.6C

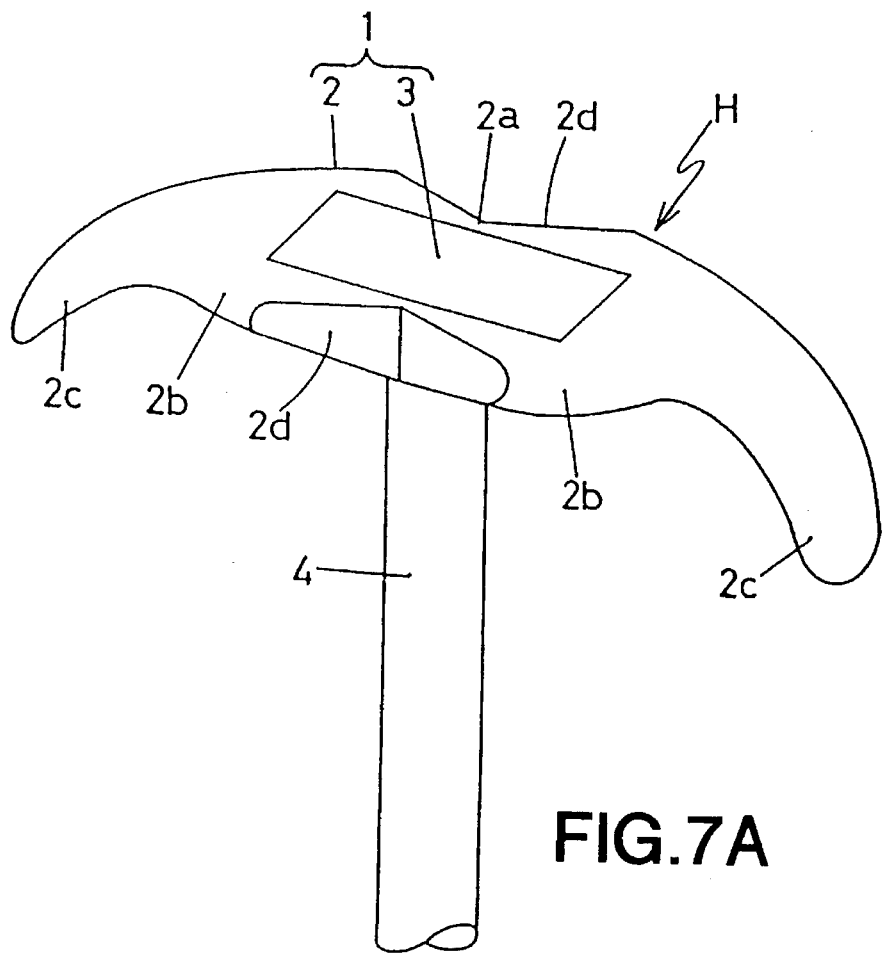
FIG.7A
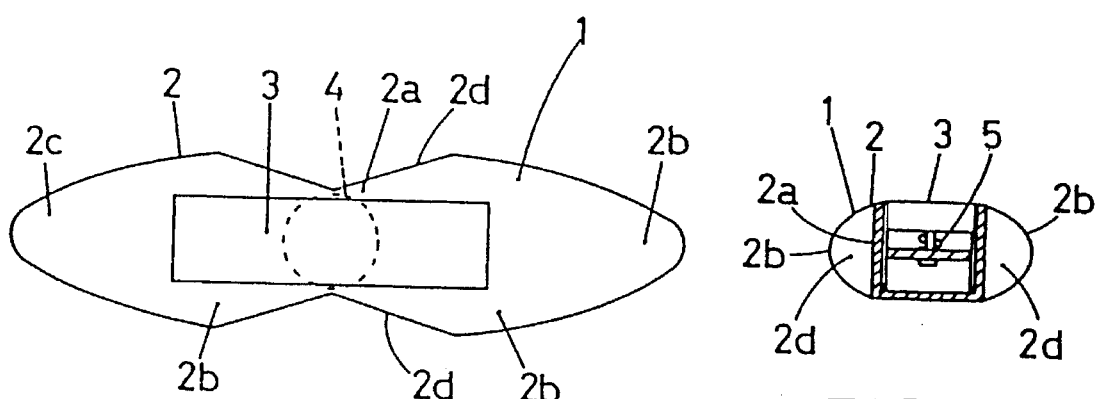
FIG.7B
FIG.7C

FIG.12A
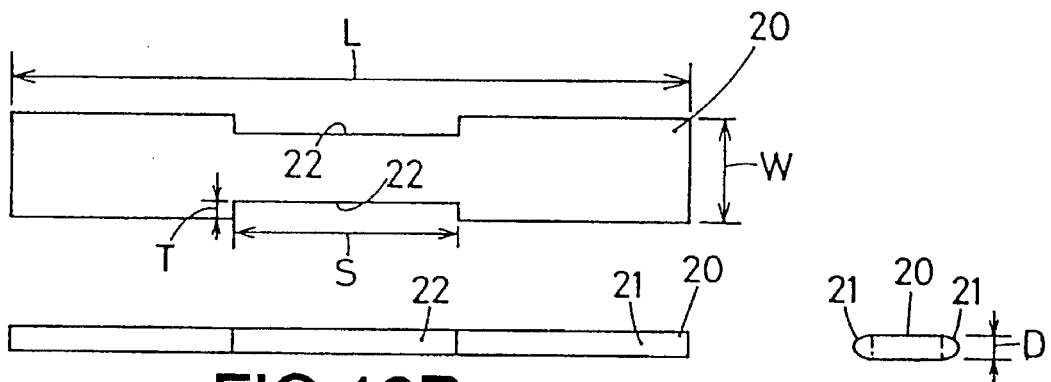
FIG.12B    FIG.12C
FIG.13A
PRIOR ART
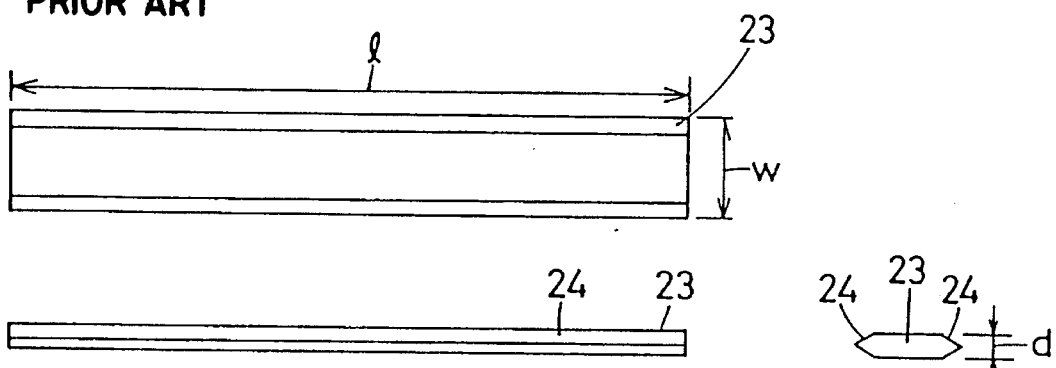
FIG.13B
PRIOR ART
FIG.13C
PRIOR ART

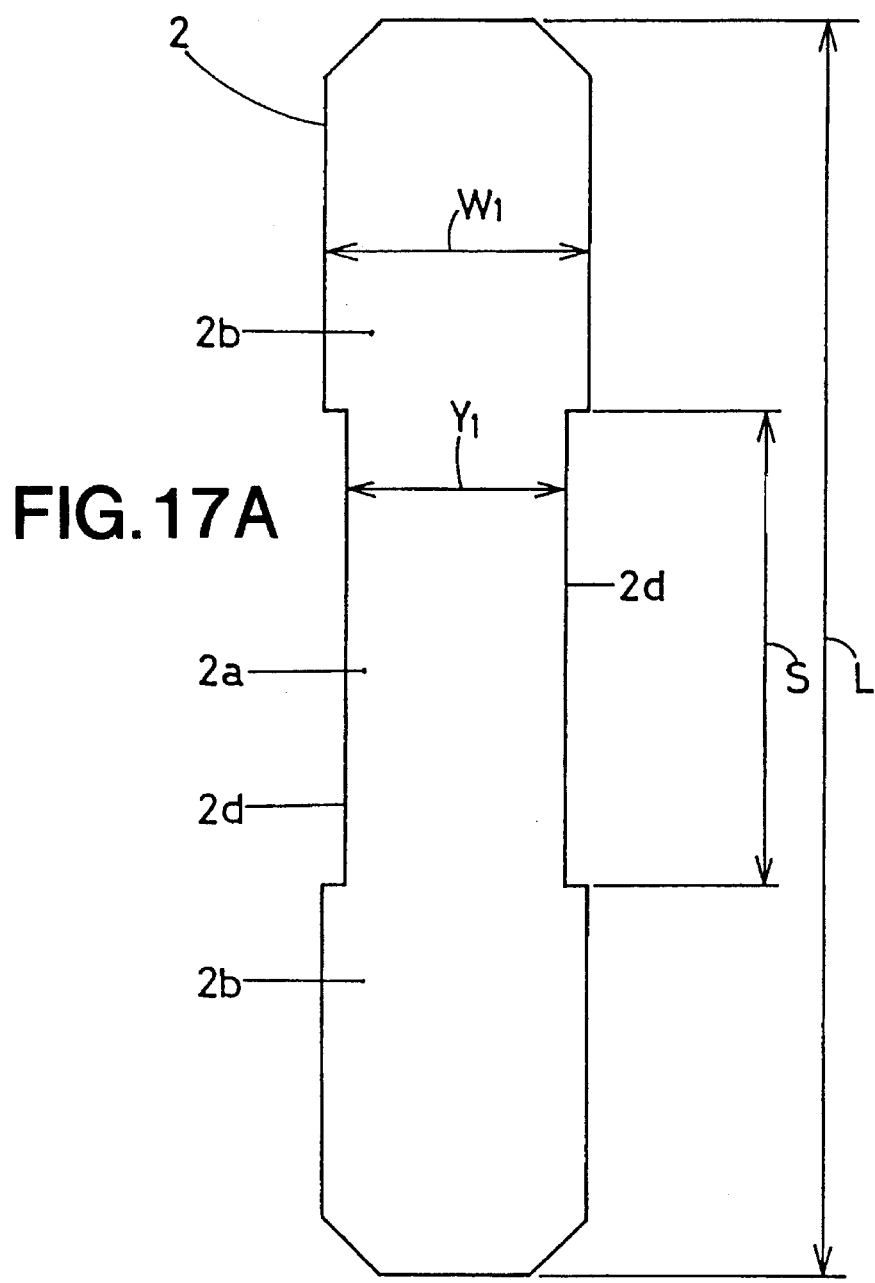
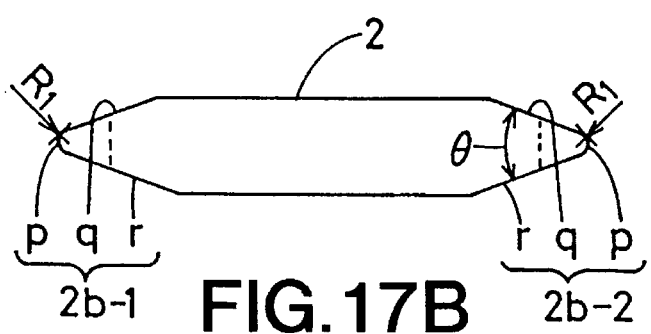

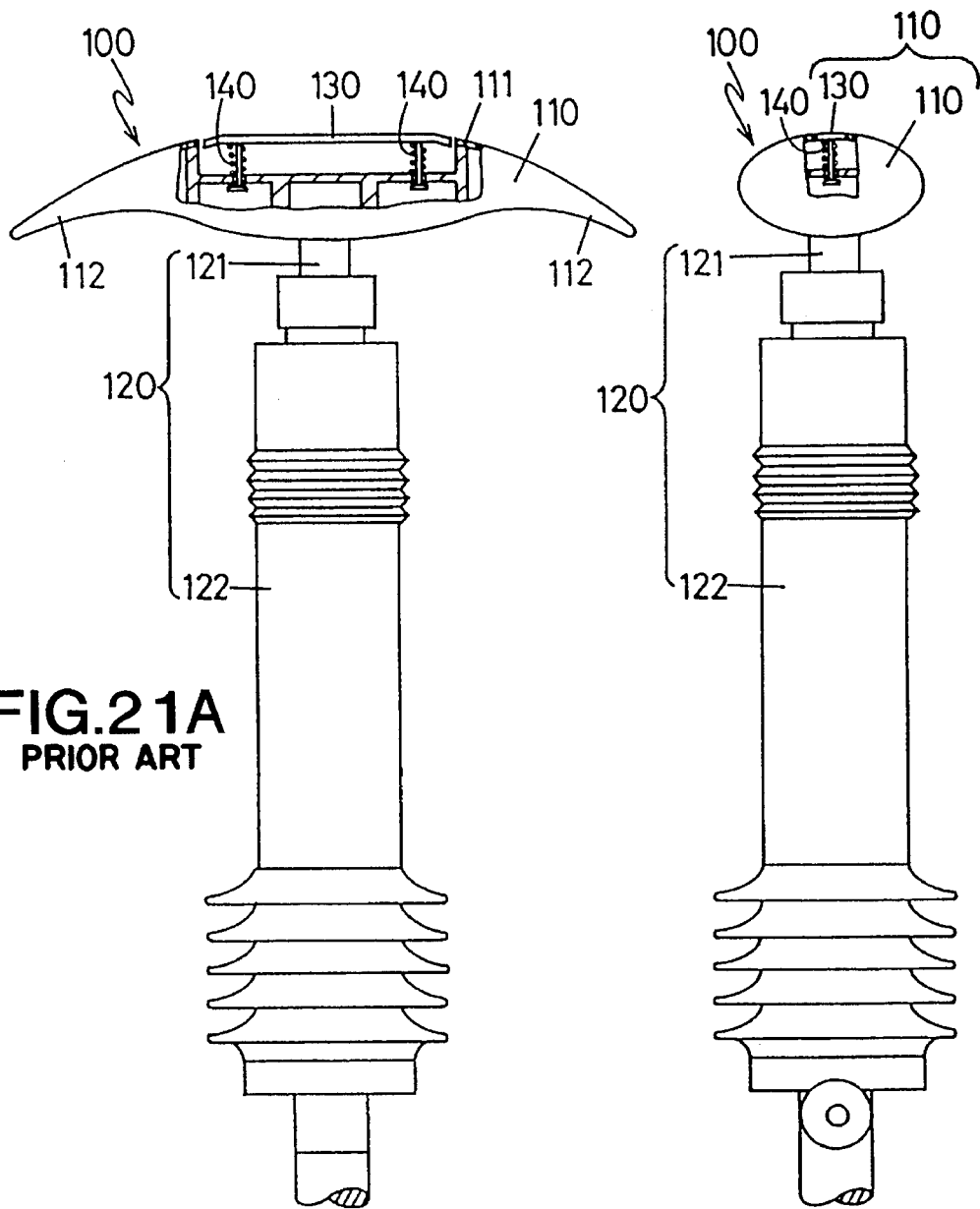

LOW AERODYNAMIC NOISE TYPE CURRENT COLLECTION EQUIPMENT

FIELD OF INDUSTRIAL APPLICATION

The present invention relates to an improvement of low aerodynamic noise type current collection equipment installed on a train roof for high speed operation. More particularly, an object of the invention is to stabilize an aerodynamic lift force generated in the current collection equipment.

In the present specification, the terms "front and rear" mean front and rear with respect to the advancing direction of the train.

PRIOR ART

Current collection equipment is generally used for contacting contact wires from below and is installed on the train roof for introducing the current from the contact wires into the interior of the train. A pantograph structure supports, by a link mechanism composed of a rhombus frame assembly, the current collection equipment. It is provided on its top surface with contact strips contacting with the contact wires so that the current collection equipment is movable up and down. However, the pantograph type current collection equipment suffers from a problem in that, in the case where the operation velocity exceeds 200 km/h, the generated aerodynamic noise level is increased so as to cause noise along the rail way.

Accordingly, instead of the above-described pantograph, Japanese Utility Model Application Laid-Open No. 5-25902 (Japanese patent Application No. 3-80695) shows a low aerodynamic noise type current collection equipment 100 (hereinafter referred to as "conventional equipment") composed of a current collector 110 having an elliptical shape or an aerodynamic shape in cross-section and a post-like support portion 120 for supporting the current collector 110 as shown in FIG. 21. Incidentally, FIG. 21 shows an outer appearance of the conventional equipment 100 on the basis of the above-described application.

The current collector 110 of the conventional equipment 100 is composed of a contact strip 130 in contact with contact wires and a collector head 111, with the contact strip 130 being buried in a top surface of the head 111. A horn portion 112 is tapered toward each end of the collector head 111 and is integrally formed with the collector head 111. A side elevation sectional shape of the collector head 111 is formed of a smooth continuous, elliptical or aerodynamic shaped surface as a whole. Incidentally, the contact strip 130 is mounted so as to be finely elastically movable up and down by springs 140 or the like. In a normal condition, the contact strip 130 is set so as to be flush with a top surface of the collector head 111 or to somewhat project from the top surface thereof.

A support portion 120 of the conventional equipment 100 is composed of a movable portion 121 which is movable up and down and connected at its top end to a bottom surface of the current collector 110, and a base portion 122 which is provided in an upright condition on the train roof and which incorporates an elevating mechanism (not shown) for the movable portion 121. In the example shown in FIG. 21, the support portion 120 is cylindrical but in some cases, the shape in a plan view thereof, may be elliptical or aerodynamically shaped to have a longitudinal direction along with the front and rear directions of the train.

In the thus constructed conventional equipment 100, in the same way as in the pantograph type current collection equipment, during the train operation, the contact strip 130 of the current collector 110 is caused to contact with a contact wire with a suitable contact force to thereby supply the train with current. In the conventional equipment 100, since the side elevational cross-section of the collector head 111 is elliptical or aerodynamically shaped, it is possible to reduce aerodynamic forces generated in the train operation in comparison with the pantograph type current collection equipment. In addition, the current collector 110 and the support portion 120 are enlarged to increase the width dimension relative to the aerial flow, to thereby function to shift the frequency of the aerodynamic noise to a low frequency range where the noise is audiometrically insensitive.

The current collection equipment basically continuously supplies the train with current and is normally in contact with the contact wire without discontinuing the contact. However, in high-speed operation of the train, there is a frequent fear, called "loss of contact", that the contact wire would be vibrated by the contact with the collector equipment so that the contact condition between the two components would be interrupted and a gap generated therebetween. The loss of contact would be frequently generated, to some extent. However, if the generation frequency would exceed an allowable range, it would be impossible to supply the necessary current, and the normal train operation would be obstructed. The loss of contact is generally generated concomitant with a spark discharge. As a result, the contact wire and the contact strip would be subject to local wear or melt damage. Furthermore, an abnormal voltage is generated in a main circuit, causing an insulation fracture, and in addition, various problems such as electric wave jamming would be caused. Accordingly, in general the current collection equipment is caused to come in contact with the contact wire by springs or the like to avoid the loss of contact.

By the way, in the train operation, the collector head 111 is subjected to an adverse wind so that an upward vertical force relative to the advancing direction, called a "aerodynamic lift force", is applied to the current collector 110. Accordingly, the spring force which urges the current collector 110 to be pressed against the contact wire must be set at a suitable level in view of the aerodynamic lift force. If the contact force would be excessive, damage or a wear of the contact wire would be accelerated. Inversely, if the force is too small, the contact loss phenomenon would be frequently caused, resulting in unstable current collection.

However, in the conventional equipment 100, since the magnitude of the aerodynamic force generated in the train operation is not stable, it is difficult to maintain a suitable contact condition between the current collector 110 and the contact wire. Accordingly, the conventional equipment could not be practically applied. The reasons why the magnitude of the aerodynamic lift force that is applied to the current collector 110 of the conventional equipment is not stable are as follows:

i) Since the diameter of the post-like support portion is large, the aerial flow is considerably turbulent at the bottom surface of the current collector.

ii) The current collector is enlarged in order to reduce the frequency of the generated aerodynamic noise. However, as a result, the support portion is subjected to a large amount of unstable, turbulent aerial flow.

iii) The collector head of the current collector is elliptical or aerodynamically shaped in cross-section. However, such a shape leads to problems such that a large aerodynamic lift force is generated in the case where the collector head is subjected to an upward flow obliquely from below, and the level of the aerodynamic lift force is considerably increased or decreased depending upon the angle at which the aerial flow collides against the current collector. Accordingly, the aerial flow having an unstable angle collides against the bottom surface of the current collector, and a remarkable change in aerodynamic force is liable to occur.

SUMMARY OF THE INVENTION

An object of the present invention is to provide a practical low aerodynamic noise type current collection equipment which is free from the above-noted defects inherent in the conventional equipment. There is provided low aerodynamic noise type current collection equipment (hereinafter simply referred to as "equipment" according to the invention) having a current collector composed of a contact strip in contact with a contact wire and a collector head having a top surface on which the contact strip is mounted. A post-like support portion supports a bottom surface of a central region of the current collector. The equipment is characterized in that a cross-sectional shape of the central region of the current collector is rectangular and a cross-sectional shape of each side region has a portion convex toward front and rear directions.

Incidentally, the cross-sectional shape of the central region of the current collector is defined by the contact strip and the collector head. In the case where the width dimension of the contact strip in the front and rear directions is sufficiently small in comparison with the width dimension of the top surface of the collector head in the front and rear directions, the cross-sectional shape of the central region of the collector head is made rectangular so that the central region of the current collector is rectangular.

Also, in the case where the width dimension of the contact strip in the front and rear directions is substantially equal to the width dimension of the top surface of the collector head, the cross-sectional shape of the central region of the current collector is made rectangular by the top surface portion of the contact strip and the bottom surface and the front and rear surfaces of the collector head.

The cross-sectional shape of each side region of the current collector may be determined by the shape of the collector head. More preferably, the shape includes an aerodynamic shape, a shape including an arc or elliptical portion convex in the front and rear directions, a shape which includes an arc or elliptical portion convex in the front and rear directions and taper portions contiguous with the arc or elliptical portion, a shape including a polygonal shape convex in the front and rear directions with corner portions being bevelled, or the like.

According to a second aspect of the invention, the equipment is characterized in that a cross-sectional area of the central region of the current collector is smaller than a cross-sectional area of each side region.

According to a third aspect of the invention, the equipment is characterized in that splitter plates extending in the front and rear directions along the advance direction of a train are provided on each side of the support portion.

According to the primary aspect of the present invention, the cross-sectional shape of the central region of the current collector is rectangular, whereby it is possible to reduce the adverse affect caused by the turbulent aerial flow around the support portion. The rectangular shape has characteristics such that the magnitude of the aerodynamic lift force would be kept substantially constant even if the inclination angle against the aerial flow is changed. Accordingly, the cross-sectional shape of the central region of the current collector, which is liable to receive turbulent aerial flow from the support portion in the current collector, makes it possible to suppress the variation in aerodynamic lift force generated in the current collector even if the angle of the aerial flow that would collide against the current collector would be unstable.

Since the turbulence of aerial flow would be small in the side regions of the current collector, the cross-sectional shape thereof is made convex in the front and rear directions in order to reduce the aerodynamic noise. However, it should be noted that the magnitude of the aerodynamic lift force to be applied to the collector head would be changed to some extent depending upon how the cross-sectional shape of the side regions is specifically taken.

According to the second aspect of the present invention, the cross-sectional area of the central region, which is liable to receive the aerial flow made turbulent by the support portion in the current collector, is smaller than that of each side region, whereby it is possible to suppress the adverse affect by of the turbulent aerial flow. In this case, it suffices that the cross-sectional shape of the current collector central region may be aerodynamically shaped or elliptical. It is, however, to have a rectangular shape on the basis of the primary aspect of the invention.

According to the third aspect of the invention, a pair of splitter plates are provided to extend from the support portion in the front and rear directions, thereby reducing the aerial resistance at the support portion and smoothing the air flow around the surfaces of the support portion while suppressing the generation of turbulence in the flow. As a result, it is possible to reduce the amount of air flow that collides against the current collector from below to thereby suppress the generation of aerodynamic lift force.

BRIEF DESCRIPTION OF THE DRAWINGS

FIG. 3A is a perspective view showing overall equipment according to a third embodiment of the invention; FIG. 3B is a plan view thereof; and FIG. 3C is a cross-sectional view of a central region of a collector head thereof.

FIG. 4A is a perspective view showing overall equipment according to a fourth embodiment of the invention; FIG. 4B is a plan view thereof; and FIG. 4C is a cross-sectional view of a central region of a collector head thereof.

FIG. 6A is a perspective view showing overall equipment according to a sixth embodiment of the invention in which a modification is applied to the equipment shown in FIG. 2; FIG. 6B is a plan view thereof; and FIG. 6C is a cross-sectional view of a central region of a collector head thereof.

FIG. 7A is a perspective view showing overall equipment according to a seventh embodiment of the invention in which a modification is applied to the equipment shown in FIG. 3; FIG. 7B is a plan view thereof; and FIG. 7C is a cross-sectional view of a central region of a collector head thereof.

FIG. 11 shows primary conditions of a wind tunnel test for confirming an aerodynamic lift force stabilizing effect according to the equipment of the invention.

FIG. 12 shows a collector head model corresponding to the equipment according to the present invention used in the wind tunnel test; and FIG. 12A is a plan view thereof, FIG. 12B is a front view thereof and FIG. 12C is a side view thereof.

FIG. 13 shows a collector head model corresponding to the conventional equipment used in the wind tunnel test; and FIG. 13A is a plan view thereof, FIG. 13B is a front view thereof and FIG. 13C is a side view thereof.

FIG. 15 shows the equipment according to the present invention used in an actual train operation test for confirming the aerodynamic lift force stabilization effect of the equipment of the present invention.

FIG. 17 shows a collector head having a basic shape used in the actual train operation test for measuring the magnitude of the aerodynamic lift force and the shape of the collector head of the equipment according to the present invention; and FIG. 17A is a plan view thereof and FIG. 17B is an enlarged side view thereof.

FIG. 18 shows a collector head having a shape with the width dimension of the central region being reduced, which collector head was used in the actual train operation test for measuring the magnitude of the aerodynamic lift force and the shape of the collector head of the equipment according to the present invention.

FIG. 19 shows a collector head having a shape, with the curvature radius of the arc of each front and rear edge of the side region being enlarged, which collector head was used in the actual train operation test for measuring the magnitude of the aerodynamic lift force and the shape of the collector head of the equipment according to the present invention.

FIG. 20 shows a collector head having a shape, with the curvature radius of the arc of each front and rear edge of the side region being enlarged and the width dimension of the central region being reduced, which collector head was used in the actual train operation test for measuring the magnitude of the aerodynamic lift force and the shape of the collector head of the equipment according to the present invention.

FIG. 21 shows a conventional equipment described in Japanese Utility Model Application Laid-Open No. 5-25902; and FIG. 21A is a fragmentary front view thereof, FIG. 21B is a fragmentary side view thereof and FIG. 21C is a plan view thereof.

DETAILED DESCRIPTION OF THE PREFERRED EMBODIMENTS

Various embodiments of the present invention will now be described with reference to the accompanying drawings.

[First Embodiment]

Figure 1A:
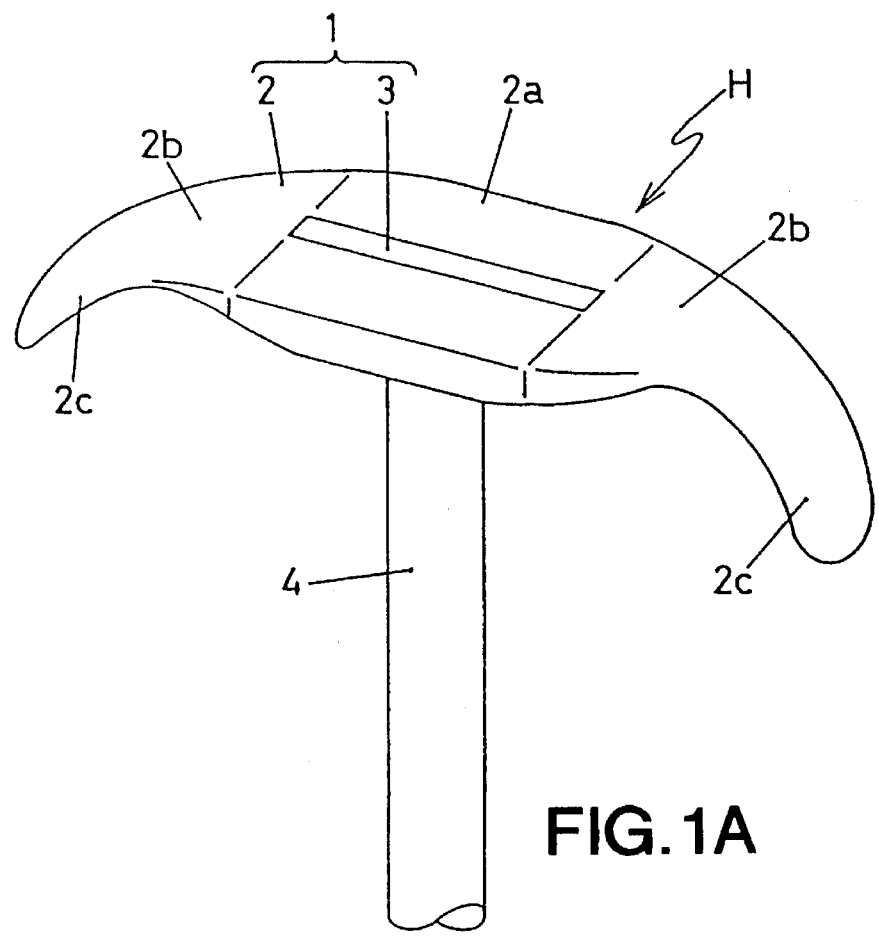
FIG. 1A is a perspective view showing overall equipment according to a first embodiment of the invention.
Figure 1B:
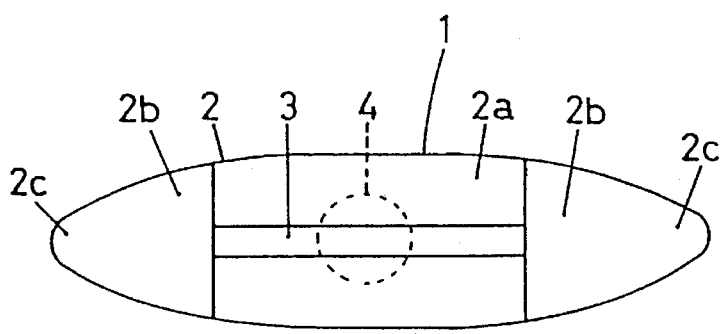
FIG. 1B is a plan view thereof.
Figure 1C:
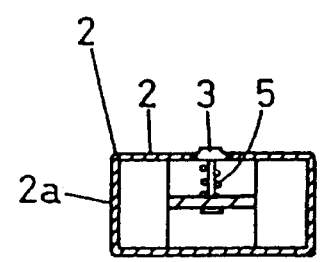
FIG. 1C is a cross-sectional view of a central region of a collector head thereof.

FIG. 1 shows equipment H according to a first embodiment of the invention. Incidentally, FIG. 1A is a perspective view of the equipment H, FIG. 1B is a plan view and FIG. 1C is a side elevational cross-sectional view of a collector 1.

The equipment H according to the present invention is composed of a current collector 1 and a support portion 4 for supporting a bottom central portion of the current collector 1. The current collector 1 is composed of a collector head 2 and a contact strip 3 embedded in a central top surface of the collector head 2. Horn portions 2c are formed to extend from both sides of the collector head 2 for smooth formation of gaps between a side wire and a main wire of contact wires. The contact strip 3 is mounted so as to be finely movable up and down by springs 5 or the like incorporated in the collector head 2.

The feature of the present embodiment is that the central region of the collector head 2 of the current collector 1 is in the form of a rectangular shape in cross section taken along the front and rear direction. The rectangular shape is advantageous in that the change in aerodynamic lift force may be suppressed against the change in angle at which the aerial flow collides, i.e., a collision angle. Accordingly, by forming the central region 2a of the collector head 2 in a rectangular shape in cross section, the adverse affect of turbulence of the aerial flow due to the support portion 4 is hardly applied to the current collector 1 so that the aerodynamic lift force to be applied to the current collector 1 may be kept constant. As a result, it is easy to maintain a suitable force which urges the contact strip 3 against the contact wire to avoid the loss of contact.

Incidentally, the cross-sectional shape of each side region 2b of the collector head 2 is formed in an aerodynamic shape, an elliptical shape or the like, that is superior in the reduction of aerodynamic noise.

By the way, the contact strip 3 would be gradually worn by contact with the contact wire. At the same time, it is usual that the top surface of the collector head 2 would be worn by contact with the contact wire. However, in the embodiment, since the cross-sectional shape of the collector head central region 2a is in the form of a rectangular shape, even if the wear would be developed, there is no change in the rectangular shape of the cross-section. Namely, the current collection equipment H according to the present invention has an advantage that, even if the top surface portion of the current collector 1 would be worn by the contact with the contact wire, the control function for controlling the aerodynamic lift force change may be insured.

[Second Embodiment]

Figure 2A:
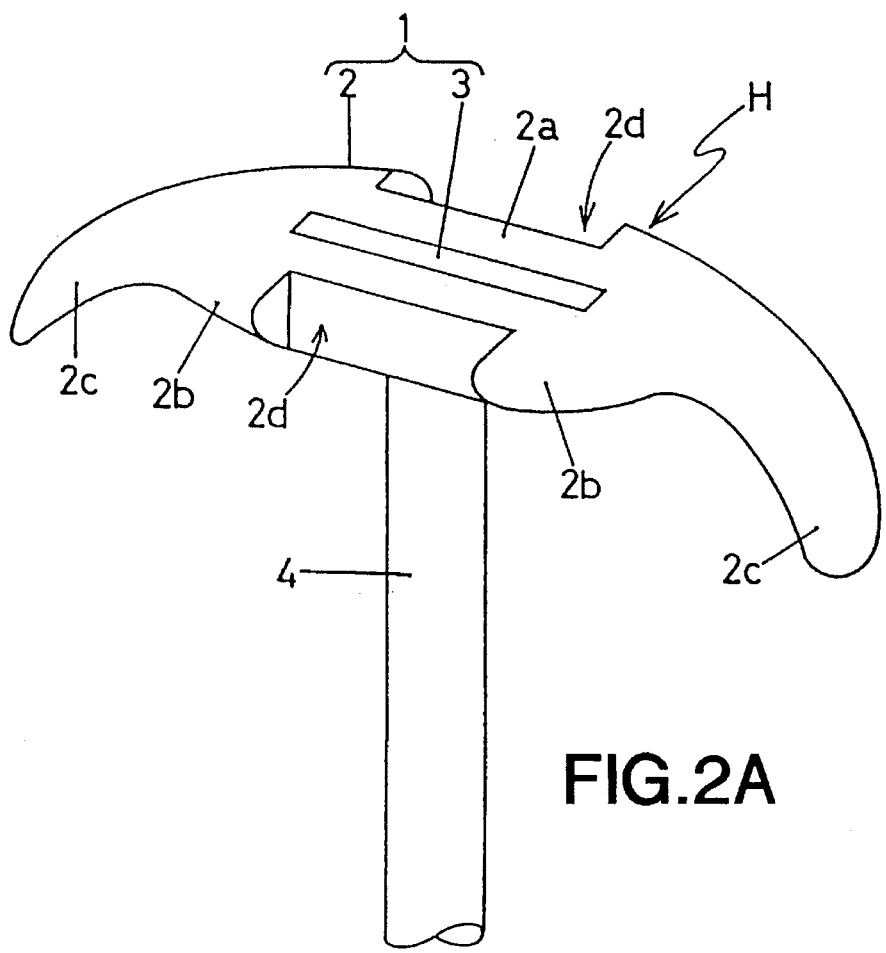
FIG. 2A is a perspective view showing overall equipment according to a second embodiment of the invention.
Figures 2B, 2C:
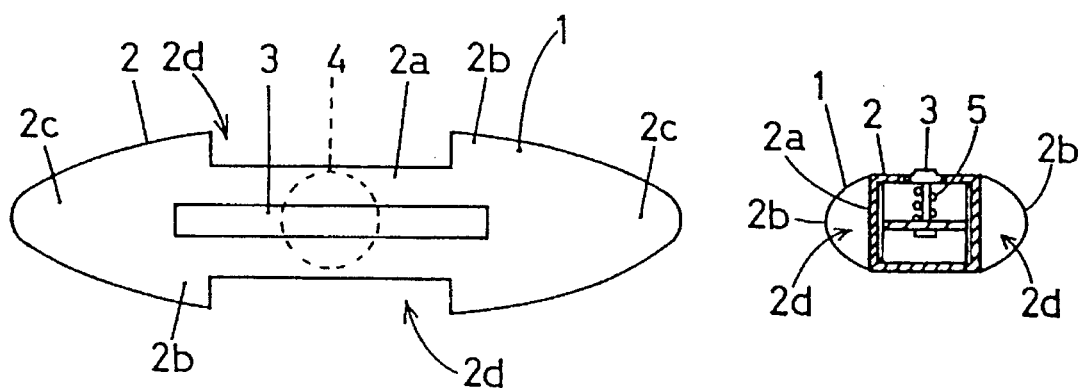
FIG. 2B is a plan view thereof.
FIG. 2C is a cross-sectional view of a central region of a collector head thereof.
Figure 5A:
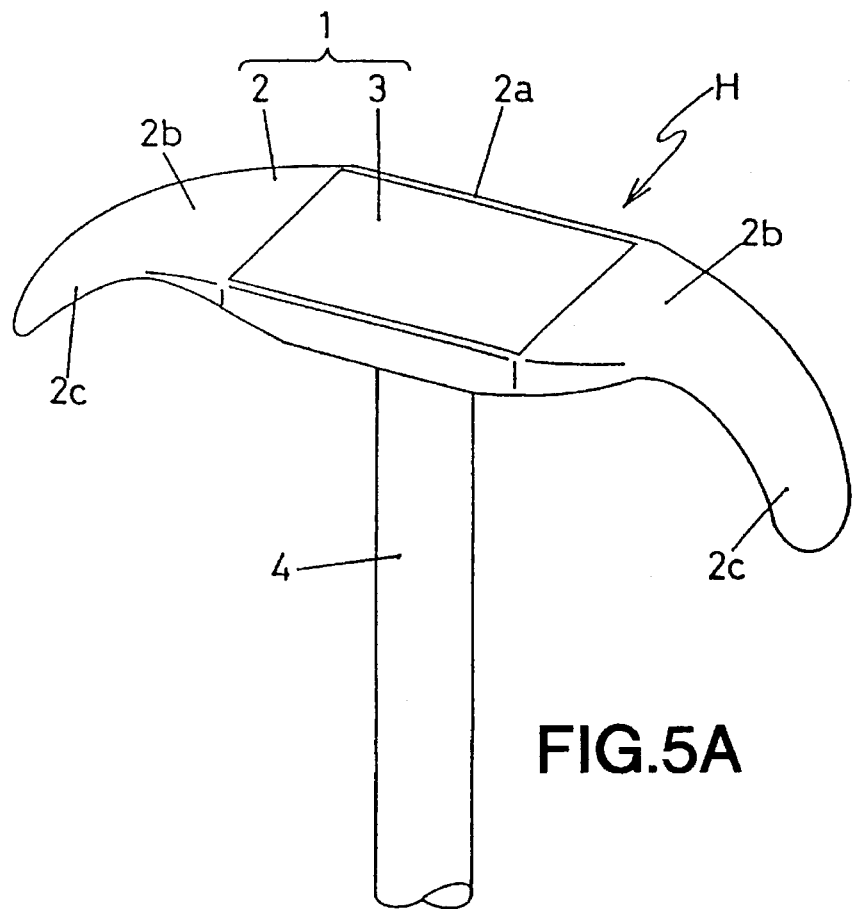
FIG. 5A is a perspective view showing overall equipment according to a fifth embodiment of the invention in which a modification is applied to the equipment shown in FIG. 1.
Figure 5B:
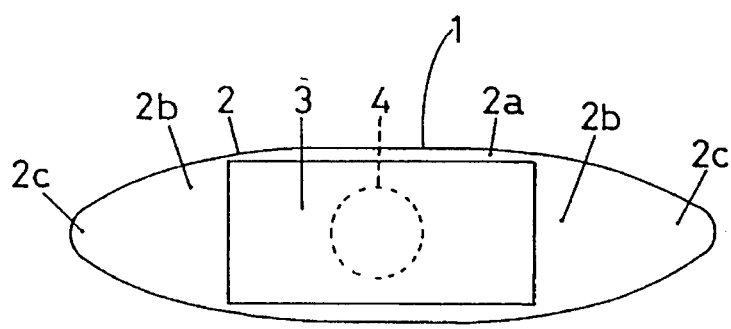
FIG. 5B is a plan view thereof.
Figure 5C:
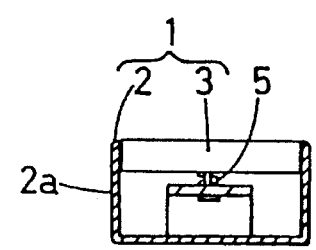
FIG. 5C is a cross-sectional view of a central region of a collector head thereof.
Figure 8A:
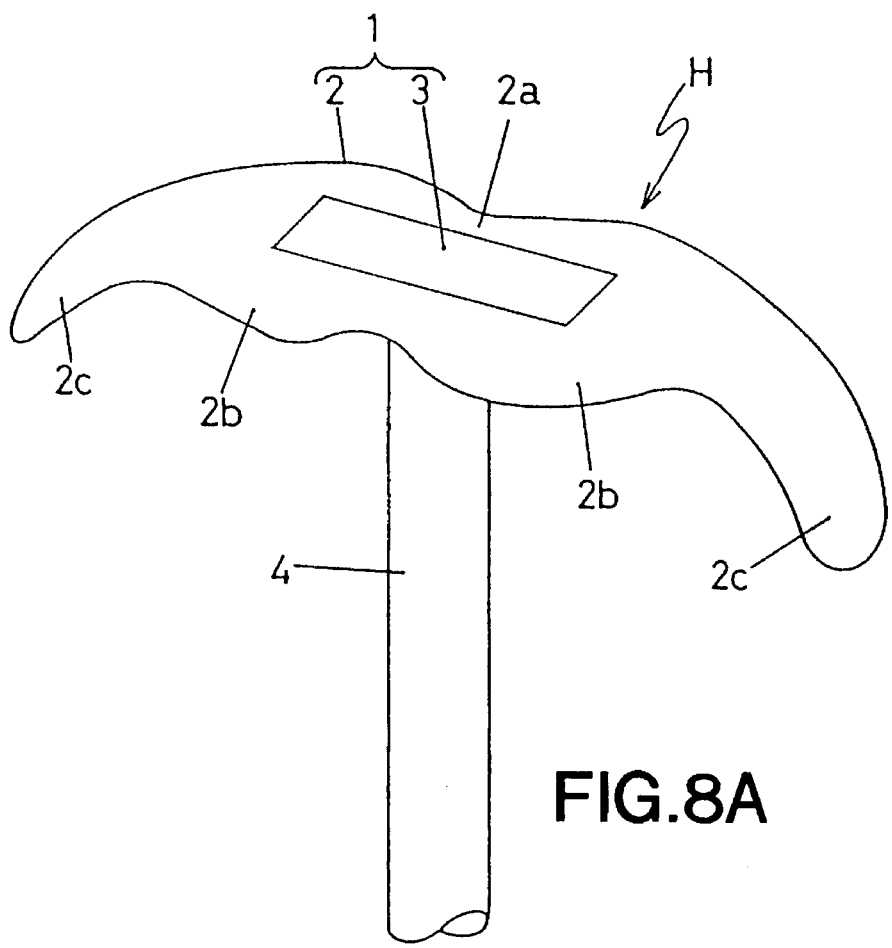
FIG. 8A is a perspective view showing overall equipment according to an eighth embodiment of the invention in which a modification is applied to the equipment shown in FIG. 4.
Figure 8B:
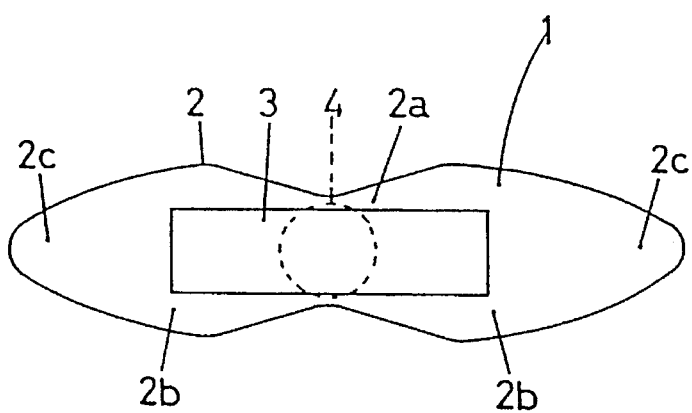
FIG. 8B is a plan view thereof.
Figure 8C:
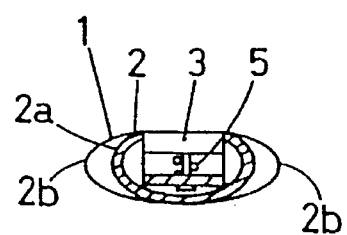
FIG. 8C is a cross-sectional view of a central region of a collector head thereof.

FIG. 2 shows an embodiment in which cutaway portions 2*d* are formed in the central region 2*a* of the collector head 2 of the current collector 1 by cutting the front and rear portions by a constant width so that the cross-section of the central region 2*a* is in the form of a rectangular shape. In the current collection equipment H according to this embodiment, since the cross-sectional area of the collector head central region 2*a* is small, the adverse affect of the aerial flow due to the support portion 4 may be further suppressed in addition to the effect of the rectangular shape of the cross-section. Also in this embodiment, the cross-sectional shape of the side regions 2*b* of the collector head 2 is composed of an elliptical portion that is convex in the front and rear direction to thereby suppress the aerodynamic noises.

[Third Embodiment]

FIG. 3 shows another embodiment in which a shape of a cutaway portion to be provided in the front and rear portions of the central region 2*a* of the collector head 2 of the current collector 1 is changed. Namely, as shown in the plan view of FIG. 3B, the front and rear portions of the central region 2*a* of the collector head 2 are cut in the form of a V-shape which is very shallow, so that the cross-section of the central region 2*a* is in the form of a rectangle and the cross-sectional area is reduced.

[Fourth Embodiment]

In the case where the cross-sectional area of the collector head central portion 2*a* of the current collector 1 is set to be smaller than the cross-sectional area of the side regions 2*b* to thereby suppress the adverse affect of the aerial flow applied from the support portion 4, it is not always necessary to make the cross-sectional shape of the central region 2*a* rectangular. For example, as shown in FIG. 4, it is possible to make the cross-sectional shape of the central region 2*a* into an elliptical shape or the like where the cross-sectional area of the central region is smaller than that of the side regions 2*b*. In this case, it is preferable to form the collector head 2 in a one-piece structure as a whole.

[Fifth Embodiment]

In the first through fourth embodiments, the width dimension of the contact strip 3 in the front and rear direction is set to be sufficiently smaller than the width dimension of the collector head 2 in the front and rear direction. As shown in FIGS. 5 through 8, it is possible to change this structure to a structure where the width dimension of the contact strip 3 is set to be substantially equal to the width dimension of the collector head 2 in the front and rear direction so that almost all the area of the top surface of the current collector 1 is occupied by the contact strip 3. With such a change, it is possible to maintain a positive contact condition with the contact wire for a long period of time even if the contact strip 3 would be worn by contact with the contact wire.

[Sixth Embodiment]

Figure 9A:
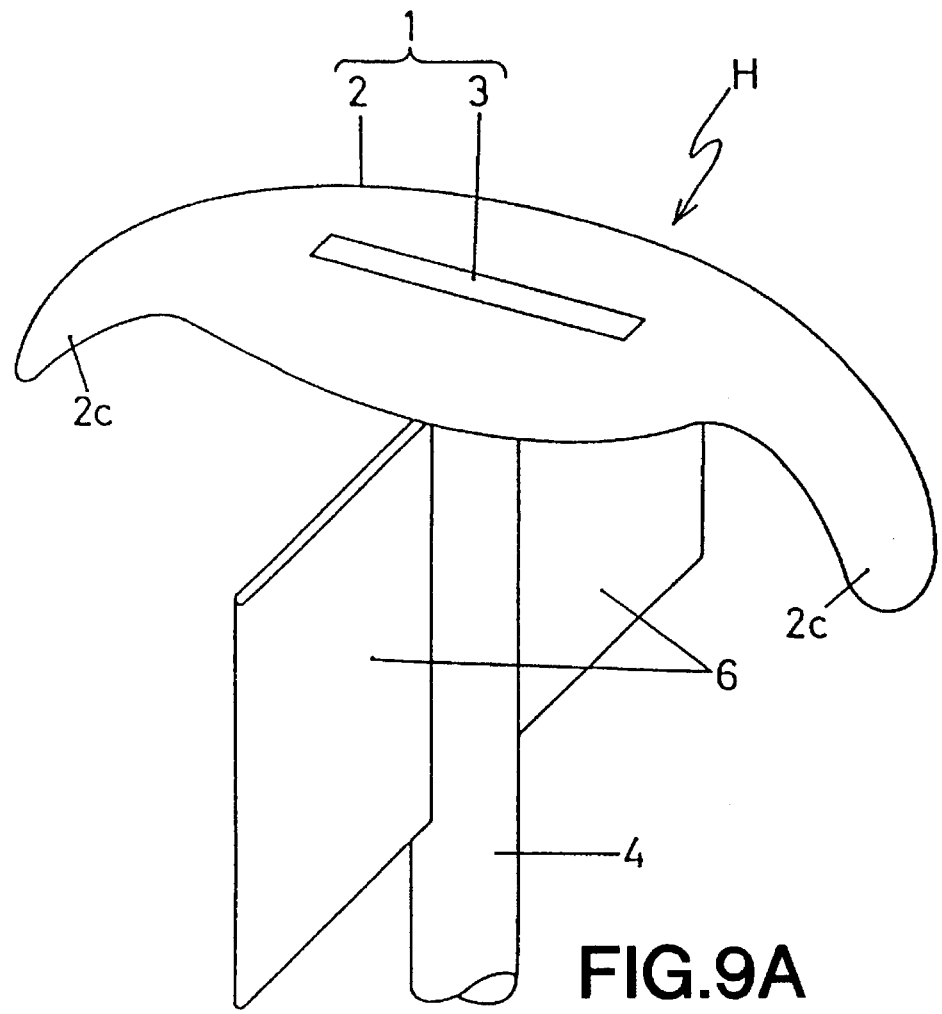
FIG. 9A is a perspective view showing overall equipment according to a ninth embodiment of the invention.
Figure 9B:
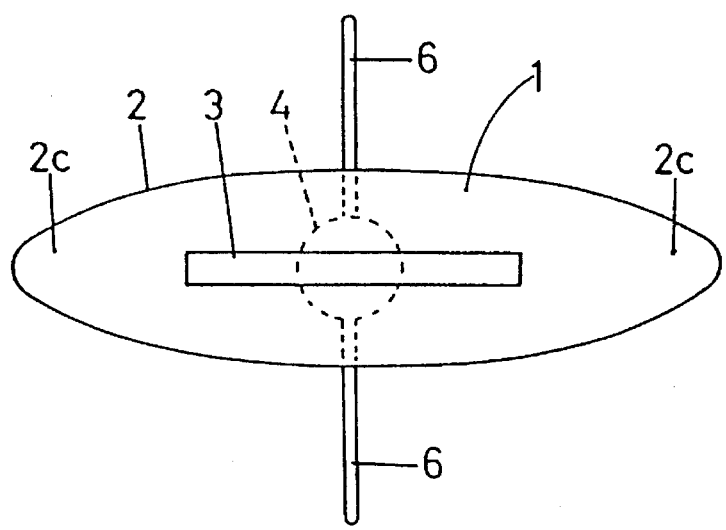
FIG. 9B is a plan view thereof.

FIG. 9 shows an embodiment in which a pair of splitter plates 6 and 6 each extending in the front and rear directions are provided on side surfaces of the support portion 4 of the current collection equipment H according to the present invention. By providing the pair of splitter plates 6 and 6, the aerial resistance of the support portion 4 is decreased so that the turbulence of the aerial flow may be suppressed. Namely, the stability of the aerial flow which effects the lower side of the collector head 2 is accelerated, thus suppressing the variation in aerodynamic lift force that will apply to the current collector 1.

Incidentally, the shape of the current collector 1 of the current collection equipment H according to the present invention shown in FIG. 9 is the same as that of the conventional current collection equipment 100 (see FIG. 21). If the shape of the current collector 1 described in conjunction with the first through fourth embodiments (see FIGS. 1 through 4) is applied thereto, it is possible to further stabilize the aerodynamic lift force.

[Seventh Embodiment]

Figure 10A:
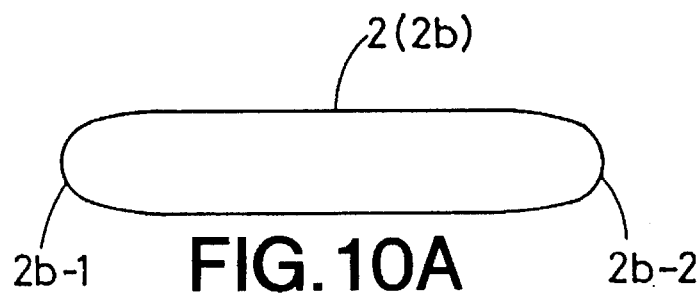
FIGS. 10A to 10E show various modifications relating to a cross-sectional shape of side regions of a collector head used in the equipment of the present invention.

It is possible to variously change the cross-sectional shape of the side regions 2*b* of the collector head 2 of the current collection equipment H according to the present invention. FIG. 10 shows the various modifications. FIG. 10A shows an example of the cross-sectional shape of the front and rear edges 2*b*-1 and 2*b*-2 of the side regions 2*b* of the collector head 2. More specifically, the cross-sectional shape is composed, in combination, of arcuate portions, elliptical portions and any other desired curved portions.

Figure 10B:
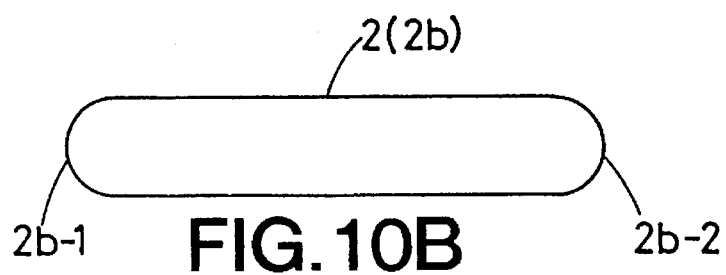

FIG. 10B shows the cross-sectional shape of the front and rear edges 2*b*-1 and 2*b*-2 of the side regions 2*b* of the collector head 2, which shape is composed of the arcuate portions only.

Figure 10C:
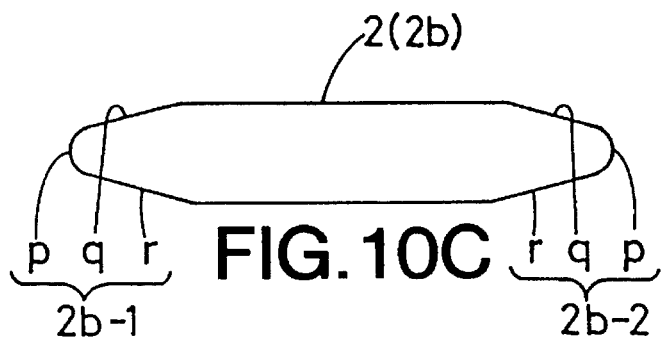

Furthermore, as shown in FIG. 10C, in the case where the cross-sectional shape of the front and rear edges 2*b*-1 and 2*b*-2 of the side region 2*b* of the collector head 2 is composed of arcuate portions p and tapered portions q and r contiguous with the arcuate portions p, it is possible to ensure the remarkable reduction effect of the aerodynamic noises.

Figure 10D:
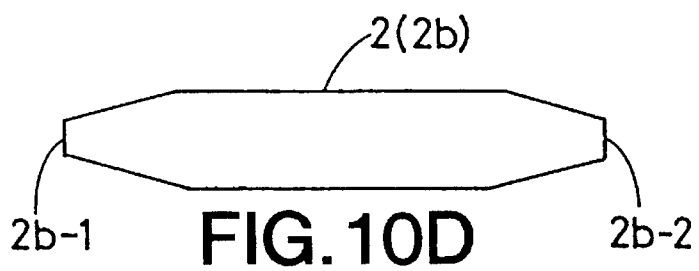
Figure 10E:
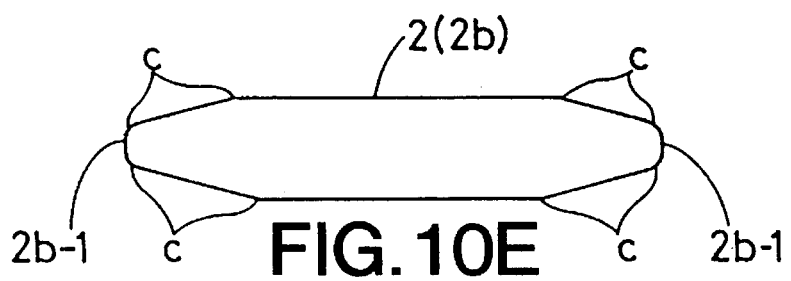

In addition, it is possible to form the cross-sectional shape of the front and rear edges 2*b*-1 and 2*b*-2 of the side regions 2*b* of the collector head 2 into polygonal shapes which are convex in the front and rear directions (where the overall cross-section is octagonal) as shown in FIG. 10D. Furthermore, it is possible to adopt the shape where the corners of the polygonal shape are bevelled. Incidentally, there is no actual limit on the number of the corners of the polygonal shape.

[Wind Tunnel Test]

Figure 11A:
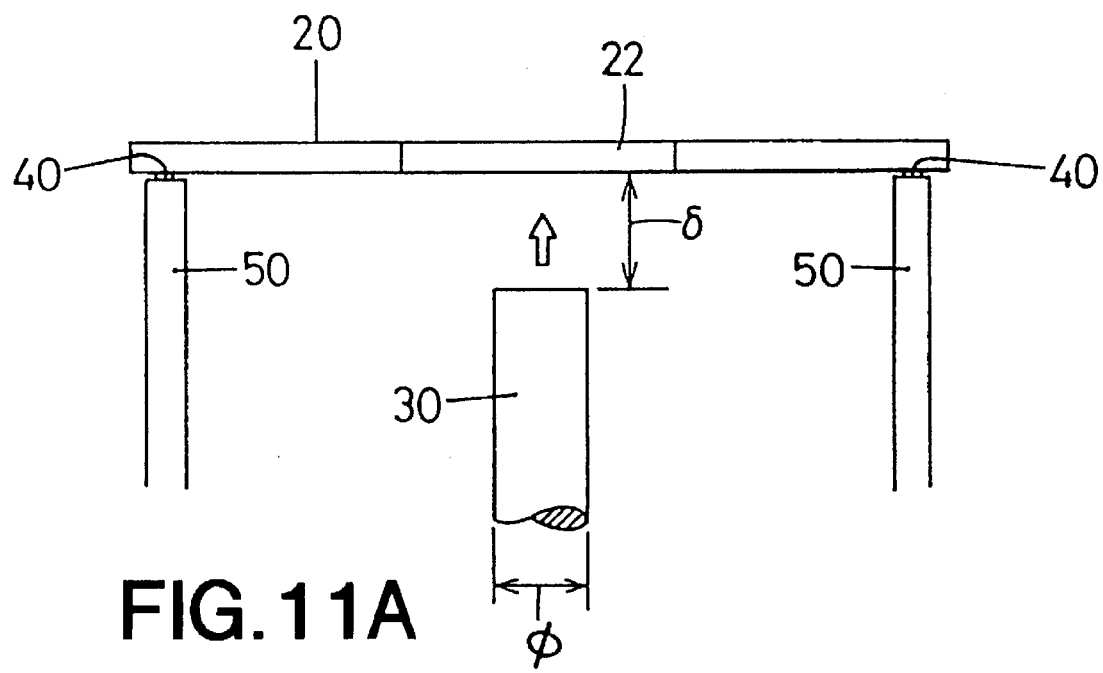
FIG. 11A is a front view thereof and FIG. 11B is a side view thereof.
Figure 11B:
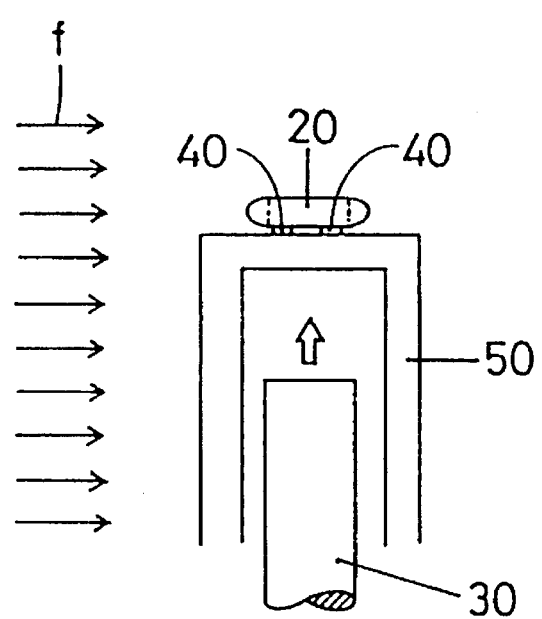

In order to confirm the effect of the aerodynamic lift force stabilization according to the present invention, a real size model was used to conduct the following wind tunnel test. In the test, as shown in FIG. 11A, both ends of the collector head model 20 were supported by posts 50 and 50 provided at their top faces with load sensors 40 and 40. As shown in FIG. 11B, wind f was fed in parallel with the top and bottom surfaces of the collector head model 20. Then, a cylindrical post 30 corresponding to the support portion was caused to approach the central portion of the bottom surface of the collector head model 20, the change of the vertical load applied to the load sensors 40 are measured and the aerodynamic lift force coefficient was calculated. Incidentally, the aerodynamic lift force is directed to a force directed vertically upwardly and applied to the model 20.

As shown in FIG. 12, with respect to the outer dimension of the collector head model 20 corresponding to the present invention, a length L was 900 mm, a width W was 138 mm, and a thickness D was 32 mm, and cutaway portions 22 and 22 each of which was 300 mm long (S) and 24 mm wide (T) were formed in the front and rear portions of the central region. Curved surfaces in the form of semi-elliptical shapes are formed in the front and rear edges 21 and 21 of the side regions.

On the other hand, as shown in FIG. 13, a collector head model 23 corresponding to the conventional equipment, which model was 900 mm long (l), 138 mm wide (w) and 38 mm thick (d) was used with the front and rear edge portions 24 and 24 being formed of taper surfaces.

A diameter φ of the cylindrical post 30 (see FIG. 11) corresponding to the support portion was 145 mm, and the test wind speed was 27 m/sec.

The measurement of the aerodynamic lift force was conducted when the distance δ between the current collector model 20 or 23 and the cylindrical post 30 was at the infinite distance (in case of absence of the cylindrical post 30), at 60 mm and at 15 mm. However, since the test system was such that the change in vertical load was detected by the load sensor 40, the test was omitted in the case here the current collector 20 and the cylindrical post 30 were brought into contact with each other (i.e., δ=0 mm).

Figure 14:
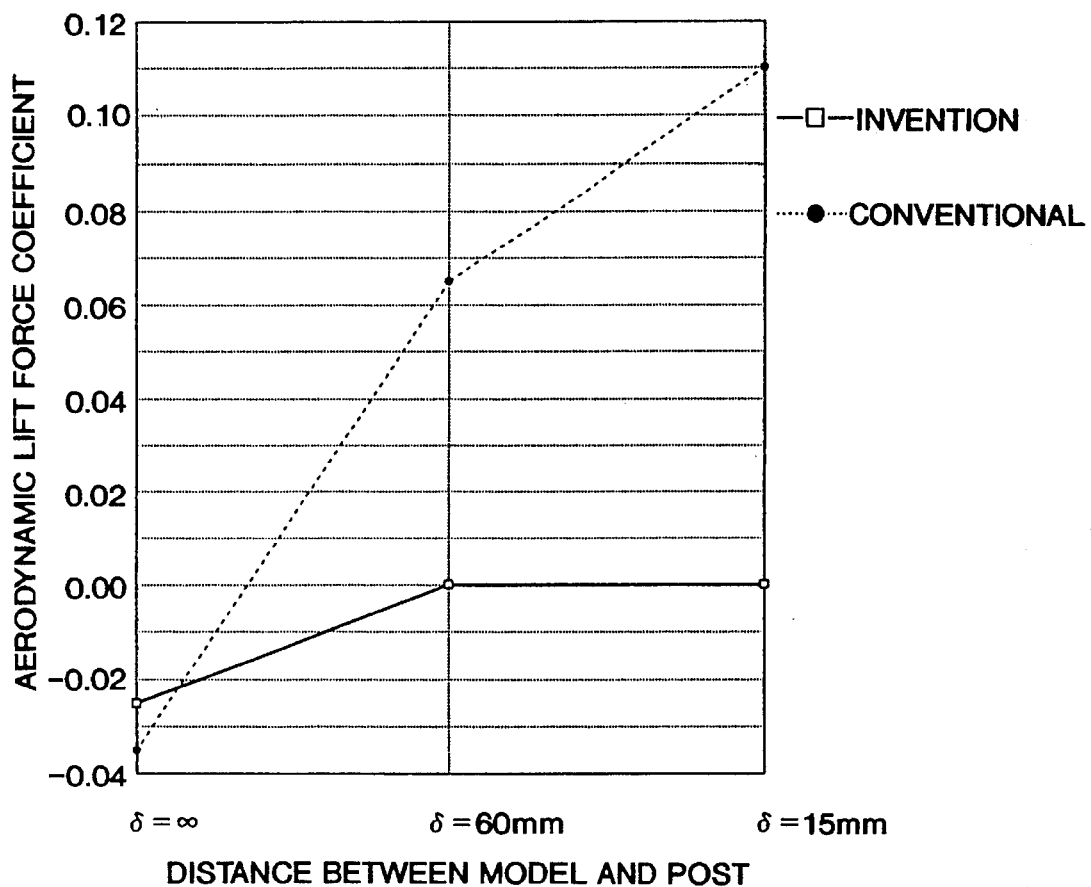
FIG. 14 is a graph showing results of the wind tunnel test, a blank square mark and a solid black circle mark indicating the values corresponding to the equipment according to the present invention and the conventional equipment, respectively.

FIG. 14 shows a test result. As was apparent from the graph of FIG. 14, there was no substantial difference in magnitude of the aerodynamic lift force applied to the models in the case where there was no cylindrical post 30. However, when the cylindrical post 30 was caused to approach the head models up to 60 mm, the adverse affect of the turbulence of the aerial flow appeared, and the aerodynamic coefficient of the collector head model 23 corresponding to the conventional equipment was increased up to 0.11. In contrast, in the collector head model 20 corresponding to the present invention, either in the case where the distance δ to the cylindrical post 30 was at 60 mm or 15 mm, the aerodynamic coefficient was almost zero. It was understood that the affect of the turbulence of the aerial flow due to the existence of the cylindrical post 30 was very small.

[Actual Train Operation Test 1]

Subsequently, in the case where the equipment according to the present invention and the conventional equipment were installed on a train roof, the difference in aerodynamic lift force between the so-called going and returning travels was measured. If the outer appearance of the train was symmetrical with respect to the front and rear direction and the current collection equipment is mounted on a substantially symmetrical axis of the train, it is understood that there is no substantial difference in aerodynamic lift force between the direction of the train operation. However, as a matter of fact, it is uncommon that the train has an exact symmetrical shape and the current collection equipment is mounted on the symmetrical axis of the train. Accordingly, the condition of the aerial flow which collides with the current collection equipment is changed depending upon the direction of operation. As a result, there is a difference in magnitude of the aerodynamic lift force between the going direction and returning direction.

Figure 15A:
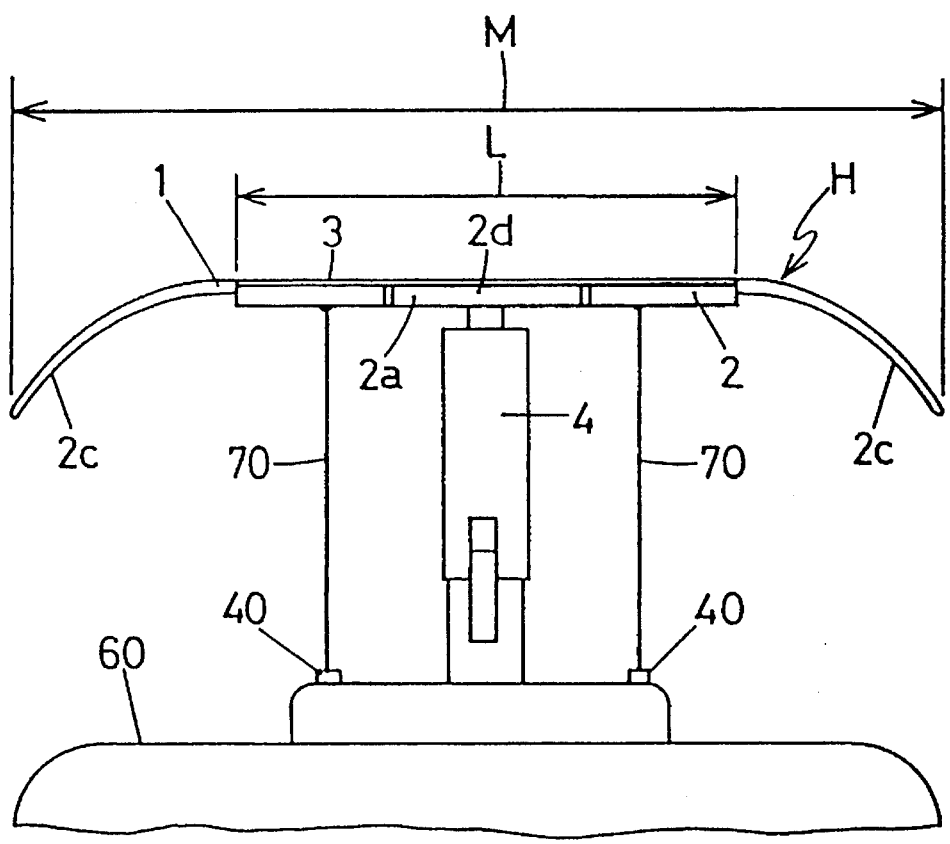
FIG. 15A is a front view thereof and FIG. 15B is a plan view thereof.
Figure 15B:
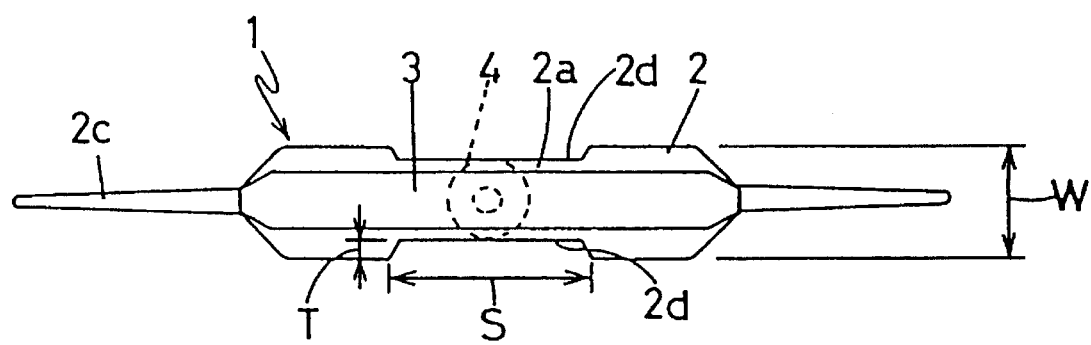

In the experiment, as shown in FIG. 15, the current collection equipment 1 composed of a current collector 1 composed of a collector head 2 having a central region 2a having a rectangular cross section by forming cutaway portions 2d on the front and rear portions and a contact strip 3 and a support portion 4 for supporting the central lower portion of the collector head 2 was mounted on the train roof 60, and the load sensors 40 arranged on the train roof 60 were connected to the bottom surface of the collector head 2 through a wire 70. The aerodynamic lift force generated when the train was operated under the condition that the contact strip 3 was not brought into contact with the contact wire was measured by the load sensors 40 and the aerodynamic lift force coefficient was calculated. Incidentally, in the conventional equipment, the above-described cutaway portions were not formed in the collector head 2.

With respect to the current collector 1 used in the experiment, the length L of the collector head 2 on which the contact strip 3 was mounted was 800 mm, the length M including the horn portions 2c was 1630 mm, and the width dimension W of the collector head 2 was 165 mm. The length S of the cutaway portions 2d formed in the central portion 2a of the collector head was 300 and the width T was 15 mm. Also, the value of the aerodynamic lift force coefficient was calculated on the basis of the average value of the aerodynamic lift force measured when the train was operated in the going and returning directions at the speed of 275 km/hours through a distance of about 2.6 km.

Figure 16:
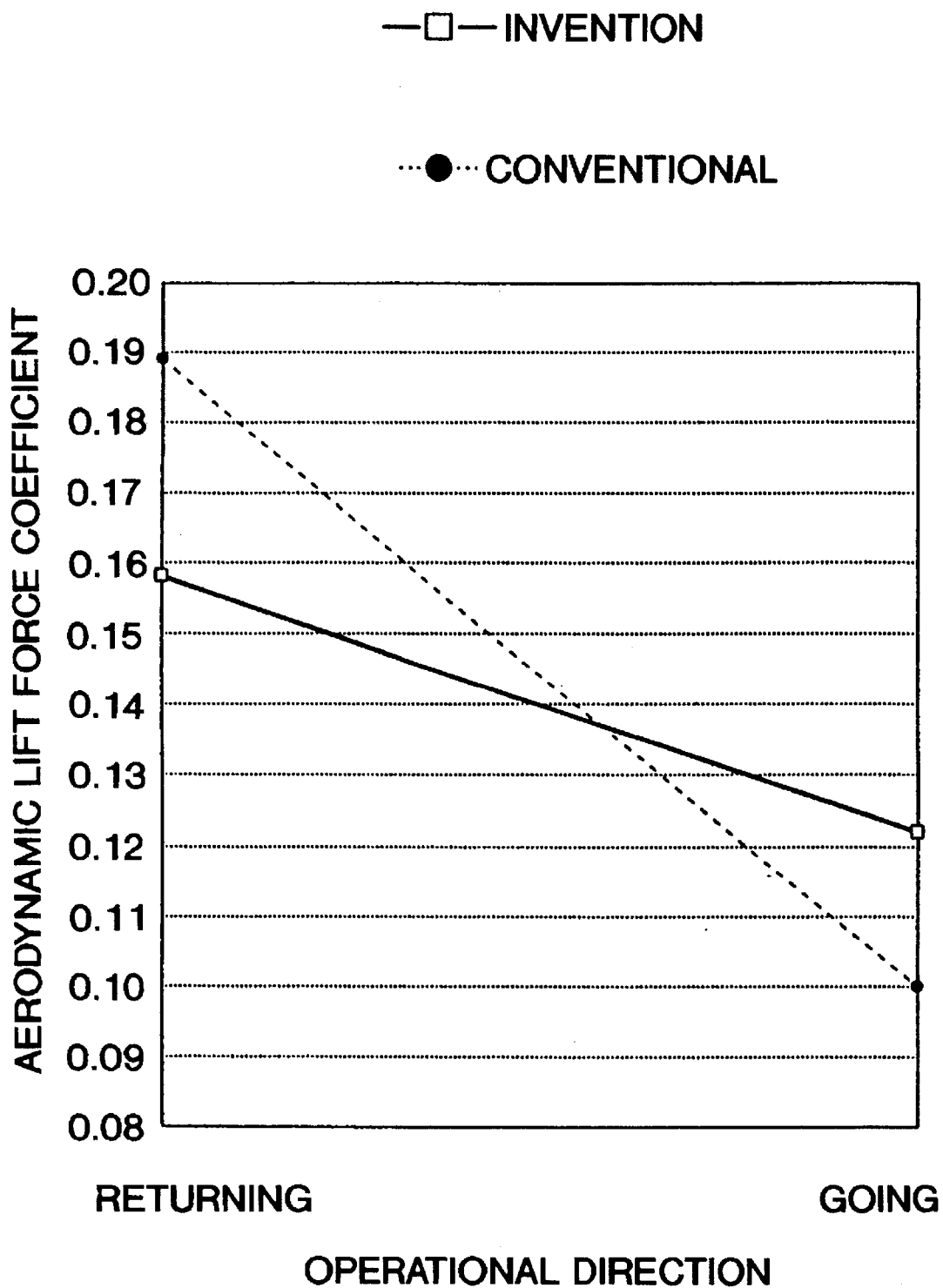
FIG. 16 is a graph showing results of the actual train operation test, a blank square mark and a solid black circle mark indicating the values corresponding to the equipment according to the present invention and the conventional equipment, respectively.

FIG. 16 shows a result of the experiment. As was apparent from this graph, it was understood that, in comparison with the conventional equipment, the variation in aerodynamic lift force (coefficient) generated between the going travel and the returning travel in the equipment according to the present invention was small. It is important to suppress the variation in aerodynamic lift force for stabilizing the contact condition of the current collection equipment with the contact wire. If the difference in aerodynamic lift force generated between the going travel and the returning travel would be large, as in the conventional equipment, it would be difficult to adjust the force that urges the current collection equipment toward the contact wire, which would cause various problems, such as a loss of contact. In contrast, according to the equipment of the present invention, even if the condition of the aerial flow would be changed due to the factors such as the difference in operation direction, the aerodynamic lift force change applied to the current collector would be small. Accordingly, the contact condition with the contact wire would be stabilized, and it is possible to avoid the fear of the various problems such as loss of contact.

[Actual Train Operation Test 2]

Although an object of the invention is to suppress the variation in aerodynamic lift force generated in the current collection equipment, needless to say it is preferable that the magnitude of the aerodynamic lift force per se is small. For example, in the current collection equipment H used in the foregoing actual operation test 1, it is preferable to suppress the aerodynamic lift force generated at the velocity of 320 k/h below 10 kgf.

Accordingly, an experiment was conducted as to how the cross-sectional shape of the side regions and the width dimension of the central region of the collector head used in the current collection equipment according to the present invention affected the magnitude of the aerodynamic lift force.

In the experiment, four kinds of collector heads 2 shown in FIGS. 17 to 20 were used. More specifically, the collector head 2 shown in FIG. 17 had the basic shape which was substantially the same as that used in the actual operation test 1. With respect to the outer dimension, its full length L was 800 mm, the width dimension $W_1$ was 165 mm, the length S of the cutaway portions 2d formed in the central region 2a was 300 mm, the width dimension $Y_1$ of the central region was 135 mm, and the cross-sectional shape of each front and rear edge 2b-1 and 262 of the side regions 2b was composed of an arc p having a curvature radius $R_1$ of 3 mm and taper portions q and r contiguous with the arc p (whose opening angle θ about 40°).

Figure 18A:
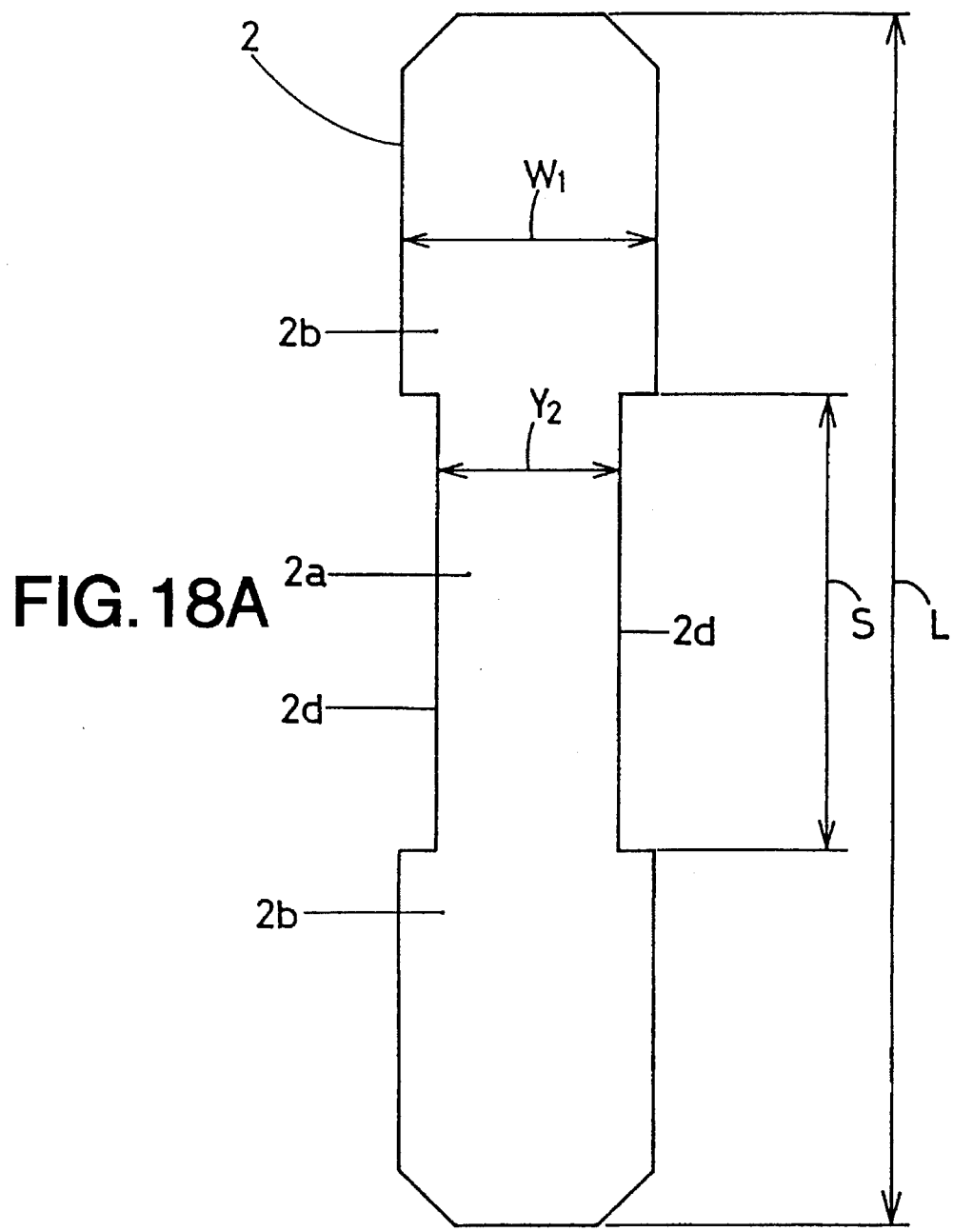
FIG. 18A is a plan view thereof and FIG. 18B is an enlarged side view thereof.
Figure 18B:
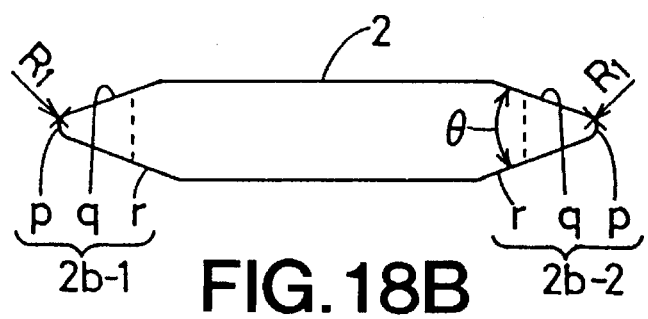

In the collector head 2 shown in FIG. 18, the width dimension $Y_2$ of the central region 2a was smaller than that of the basic shape of the collector head shown in FIG. 17 and was 120 mm.

Figure 19A:
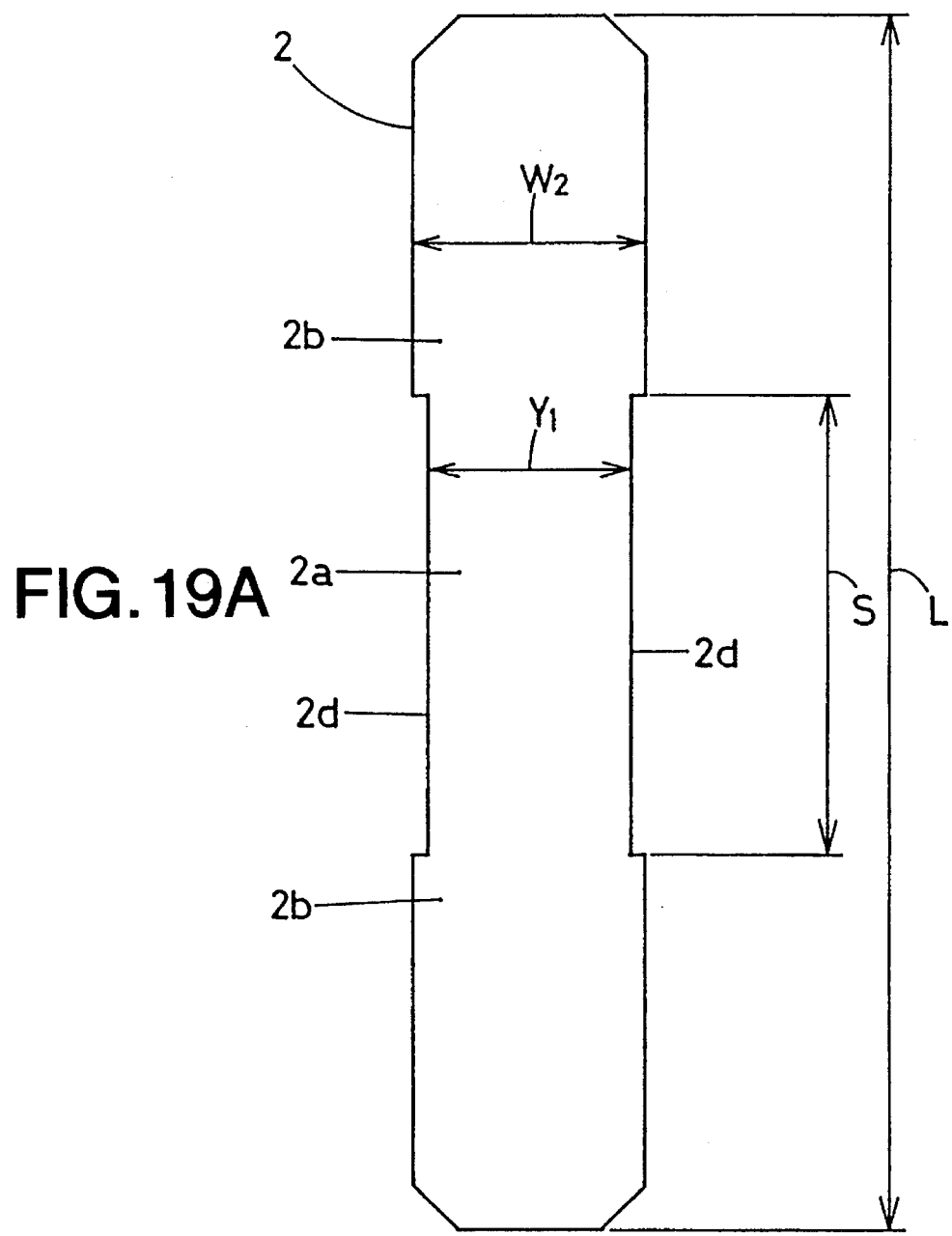
FIG. 19A is a plan view thereof and FIG. 19B is an enlarged side view thereof.
Figure 19B:
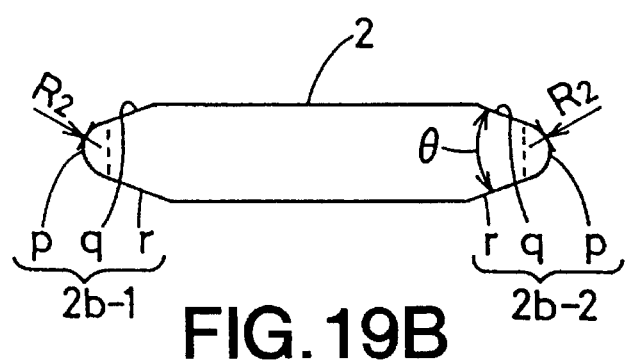

In the collector head 2 shown in FIG. 19, the curvature radius $R_2$ of the arc p constituting a part of the cross-sectional shape of the side regions 2b was enlarged to 8 mm and in view of the manufacture aspect, the width dimension $W_2$ was shortened to about 150 mm.

Figure 20A:
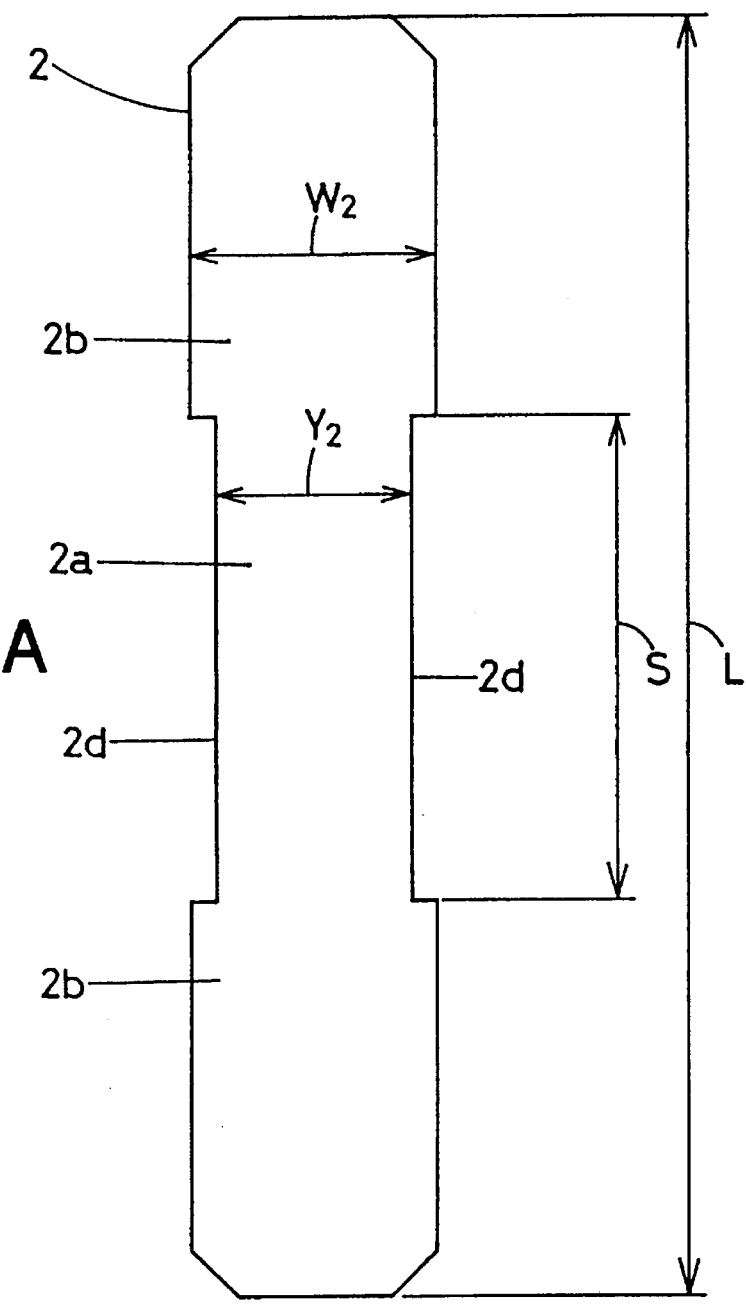
FIG. 20A is a plan view thereof and FIG. 20B is an enlarged side view thereof.
Figure 20B:
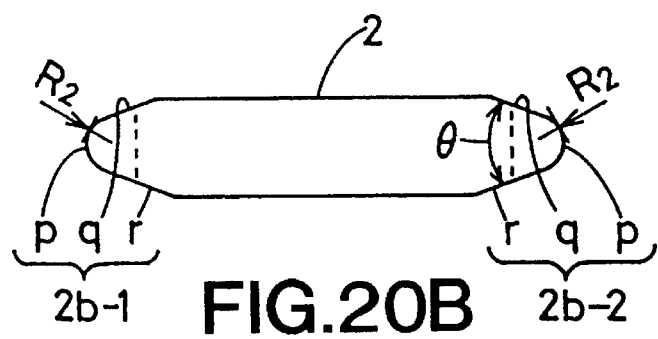

The collector head 2 shown in FIG. 20 included two change points shown in FIGS. 18 and 19. More specifically, the basic shape of the collector head shown in FIG. 17 was changed to a shape where the width dimension $Y_2$ of the central region 2a was 120 mm, and the curvature radius $R_2$ of the arc p and the width dimension W2 of each front and rear edge 2b-1 and 2b-2 of the side regions 2b were 8 mm and about 150 mm, respectively.

The measurement of the aerodynamic lift force was conducted substantially in the same manner as that for the actual operation test 1. The data were taken by measuring the parameters during the going and returning operation through bright and tunnel areas at the velocity of 275 km/h. The measurement results are shown in Table 1.

| Test No. | collector head area (m²) | area ratio (a) | measurement value (kgf) at 275 km/h bright tunnel | (%) (b) | corrected (%) (b/a) | measurement value (kgf) at 320 km/h bright tunnel | Note |
|---|---|---|---|---|---|---|---|
| | | | AERODYNAMIC LIFT FORCE TEST RESULT | | | | |
| 1 | 0.1108 | 1.00 | 6.65 | 100 | 100 | 9.23 | FIG. 17 |
| | | | 8.11 | 100 | 100 | 11.63 | |
| 2 | 0.10645 | 0.96 | 4.58 | 69 | 72 | 6.14 | FIG. 18 |
| | | | 5.96 | 73 | 76 | 7.85 | |
| 3 | 0.1048 | 0.95 | 5.52 | 83 | 87 | 7.44 | FIG. 19 |
| | | | 8.62 | 106 | 112 | 11.66 | |
| 4 | 0.10045 | 0.91 | 1.53 | 23 | 25 | 2.04 | FIG. 20 |
| | | | 3.20 | 39 | 43 | 4.19 | |

As shown in the test result of Table 1, also according to the collector head 2 (test No. 1) having the basic shape shown in FIG. 17, on the calculation, it was possible to reduce the magnitude of the aerodynamic lift force below 10 kgf in the bright area operation at the velocity of 320 km/h. However, in the tunnel area operation, an aerodynamic lift force exceeding 10 kgf was generated. Accordingly, if the cutaway portions 2d were enlarged as in the collector head shown in FIG. 18 (test No. 2) so that the width dimension of the central region 2a was shortened, it was possible to reduce the generated aerodynamic force by approximately 30%.

Also, as in the collector head 2 shown in FIG. 19 (test No. 3), it was understood that it was possible to suppress the generation of the aerodynamic lift force in the bright area by enlarging the curvature radius of the arc p of each front and rear edge 2b-1 and 2b-2 of the side regions 2b.

Then, it was found that, according to the collector head shown in FIG. 20 (test No. 4) in which the change points of FIG. 18 and FIG. 19 were combined together, a remarkable aerodynamic lift force suppression effect which much exceeded the expected range exhibited by the simple combination of these points.

As described above, according to the present invention, since it is possible to suppress the variation in aerodynamic lift force exerted on the current collection equipment during the train operation, the force that urges the current collection equipment against the contact wire may be stabilized. As a result, since it is easy to maintain a suitable contact condition between the current collection equipment and the contact wire, there is no fear, as had been experienced in the convention equipment, that the pressure force of the current collection equipment against the contact wire would be excessive so that the contact wire would be damaged, or the pressure force would be too small so that the loss of contact would frequently occur.

It is also possible to considerably reduce the generated aerodynamic lift force by changing the cross-sectional shape of the side region and the width dimension of the central region of the collector head.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

We claim:

1. A low aerodynamic noise type current collector, comprising:

a contact strip for contacting a wire;

a collector head having a lateral dimension in a lateral direction that is longer than a longitudinal dimension in a longitudinal direction, said collector head comprising lateral ends, a central region having a bottom surface, side regions at said lateral ends and a top surface, said contact strip being mounted on said collector head at said top surface so as to extend in the lateral direction; and an elongate support portion supporting said collector head at said bottom surface;

wherein said central region of said collector head has a vertical cross-sectional shape in the longitudinal direction that is rectangular and said side regions of said collector head each have a vertical cross-sectional shape in the longitudinal direction that includes portions that are convex in front and rear orientations of the longitudinal direction.

2. The low aerodynamic noise type current collector of claim 1, wherein said cross-sectional shapes of said side regions are aerodynamic shapes.

3. The low aerodynamic noise type current collector of claim 1, wherein said cross-sectional shapes of said side regions each comprises an arc or an elliptical shape convex in the front and rear orientations of the longitudinal direction.

4. The low aerodynamic noise type current collector of claim 1, wherein said cross-sectional shapes of said side regions each comprises an arc or an elliptical shape convex in the front and rear orientations of the longitudinal direction and taper portions that are contiguous with said arc or said elliptical shape.

5. The low aerodynamic noise type current collector of claim 1, wherein said cross-sectional shapes of said side regions each comprises a polygonal portions that are convex in the front and rear orientations of the longitudinal direction.

6. The low aerodynamic noise type current collector claim 1, wherein said cross-sectional shapes of said side regions each comprises a polygonal portions that are convex in the front and rear orientations of the longitudinal direction, said polygonal portions having corners that are beveled.

7. The low aerodynamic noise type current collector of claim 1, wherein said contact strip has a width dimension in the longitudinal direction that is substantially equal to the width dimension of said top surface of said collector head in the longitudinal direction, said collector head further comprises front and rear surfaces and said rectangular cross-sectional shape of said central region of said collector head is formed by a top surface of said contact strip and said bottom surface, said front surface and said rear surface of said collector head.

8. The low aerodynamic noise type current collector of claim 7, wherein said cross-sectional shapes of said side regions are aerodynamic shapes.

9. The low aerodynamic noise type current collector of claim 7, wherein said cross-sectional shapes of said side regions each comprises an arc or an elliptical shape convex in the front and rear orientations of the longitudinal direction.

10. The low aerodynamic noise type current collector of claim 7, wherein said cross-sectional shapes of said side regions each comprises an arc or an elliptical shape convex in the front and rear orientations of the longitudinal direction and taper portions that are contiguous with said arc or said elliptical shape.

11. The low aerodynamic noise type current collector of claim 7, wherein said cross-sectional shapes of said side regions each comprises a polygonal portions that are convex in the front and rear orientations of the longitudinal direction.

12. The low aerodynamic noise type current collector claim 7, wherein said cross-sectional shapes of said side regions each comprises a polygonal portions that are convex in the front and rear orientations of the longitudinal direction, said polygonal portions having corners that are beveled.

13. The low aerodynamic noise type current collector of claim 1, wherein said contact strip has a width dimension in the longitudinal direction that is much smaller than the width dimension of said top surface of said collector head in the longitudinal direction.

14. The low aerodynamic noise type current collector of claim 13, wherein said cross-sectional shapes of said side regions each comprises an arc or an elliptical shape convex in the front and rear orientations of the longitudinal direction.

15. The low aerodynamic noise type current collector of claim 13, wherein said cross-sectional shapes of said side regions each comprises an arc or an elliptical shape convex in the front and rear orientations of the longitudinal direction and taper portions that are contiguous with said arc or said elliptical shape.

16. The low aerodynamic noise type current collector of claim 13, wherein said cross-sectional shapes of said side regions each comprises a polygonal portions that are convex in the front and rear orientations of the longitudinal direction.

17. The low aerodynamic noise type current collector claim 13, wherein said cross-sectional shapes of said side regions each comprises a polygonal portions that are convex in the front and rear orientations of the longitudinal direction, said polygonal portions having corners that are beveled.

18. The low aerodynamic noise type current collector of claim 13, wherein said cross-sectional shapes of said side regions are aerodynamic shapes.

19. The low aerodynamic noise type collector of claim 18, wherein said contact strip projects above said top surface of said collector head.

20. A low aerodynamic noise-type current collector, comprising:

a contact strip for contacting a wire;

a collector head having a lateral dimension in a lateral direction that is longer than a longitudinal dimension in a longitudinal direction, said collector head comprising lateral ends, a central region having a bottom surface, side regions at said lateral ends and a top surface, said contact strip being mounted on said collector head at said top surface so as to extend in the lateral direction; and an elongate support portion supporting said collector head at said bottom surface;

wherein said central region of said collector head has a vertical cross-sectional area in the longitudinal direction, said side regions of said collector head each have a vertical cross-sectional area in the longitudinal direction, and said vertical cross-sectional area of said central region is smaller than said vertical cross-sectional area of each said side region.

* * * * *